United States Patent [19]

Capps

[11] Patent Number: 5,151,998
[45] Date of Patent: Sep. 29, 1992

[54] SOUND EDITING SYSTEM USING CONTROL LINE FOR ALTERING SPECIFIED CHARACTERISTIC OF ADJACENT SEGMENT OF THE STORED WAVEFORM

[75] Inventor: Stephen P. Capps, San Carlos, Calif.

[73] Assignee: Macromedia, Inc., San Francisco, Calif.

[21] Appl. No.: 292,299

[22] Filed: Dec. 30, 1988

[51] Int. Cl.⁵ .................. G11B 27/28; G11B 27/02; G11B 7/36
[52] U.S. Cl. .................. 395/800; 364/DIG. 2; 364/922.7; 364/DIG. 1; 395/100
[58] Field of Search ... 364/200 MS File, 900 MS File; 381/68; 360/13

[56] References Cited

U.S. PATENT DOCUMENTS

| | | | |
|---|---|---|---|
| 4,215,343 | 7/1980 | Ejiri et al. | 340/711 |
| 4,378,466 | 3/1983 | Esser | 381/48 |
| 4,401,850 | 8/1983 | Harbeson | 381/48 |
| 4,627,001 | 12/1986 | Stapleford et al. | 364/513.5 |
| 4,641,343 | 2/1987 | Holland et al. | 381/48 |
| 4,646,256 | 2/1987 | Bracewell | 364/725 |
| 4,868,687 | 9/1989 | Penn et al. | 360/13 |
| 4,881,440 | 11/1989 | Kakizaki | 84/609 |
| 4,974,178 | 11/1990 | Izeki et al. | 364/523 |

FOREIGN PATENT DOCUMENTS 63-124290  5/1988  Japan .

OTHER PUBLICATIONS

Gosch "Voire-synthesizer editor displays speech as curves easily alterable by keyboard", Electronic, vol. 55, No. 17, Aug. 1982, pp. 68, 70.
"High Resolution Graphics Teleconferencing", Defense Communications Agency, dated Jan., 1988, pp. 45-60.

Primary Examiner—David Y. Eng
Assistant Examiner—Larry Donaghue
Attorney, Agent, or Firm—Skjerven, Morrill, MacPherson, Franklin & Friel

[57] ABSTRACT

A hardware and software system and method for a personal computer such as the Macintosh allows recording, editing, and playback of sound. The system includes a sound editor which displays sound waveforms, and permits the user to mix together several simultaneously displayed waveforms, and to change the pitch and amplitude of one part of each waveform by means of a novel screen display.

35 Claims, 8 Drawing Sheets

SOUND EDITING SYSTEM USING CONTROL LINE FOR ALTERING SPECIFIED CHARACTERISTIC OF ADJACENT SEGMENT OF THE STORED WAVEFORM

BACKGROUND OF THE INVENTION

1. Field of the Invention

This invention relates to a computer sound editing system, and especially to the means by which the system visually displays and edits the sound and to the method for displaying and editing the sound.

2. Description of the Prior Art

Sound editing by means of computers is well known. However, those computer sound editors known in the art typically employ cumbersome methods for displaying and manipulating waveforms. The known sound editing systems, such as are typically used for editing sounds for recordings, movies, etc., are especially difficult to use for the common sound editing functions of mixing, adjusting volume for parts of a sound, and for adjusting pitch for parts of a sound. The prior art does not provide a convenient user interface to give the user sufficient control to easily align the waveforms and adjust their characteristics to achieve a desired result.

SUMMARY OF THE INVENTION

In accordance with the present invention, a novel sound editing system and method is provided. While the sound editing system and method of this invention are preferably used with the Macintosh computer, this invention also may be used with other computers. The system of this invention provides means for entering and storing sound waveforms in a computer memory, for visually displaying the waveform on a computer screen, and for altering the stored waveform by making changes in the appearance of the waveform on the screen, which changes are translated by the computer into changes in the stored waveform.

The system includes means for simultaneously displaying several sound waveforms on the screen for purposes of mixing them (i.e., combining several sound waveforms into one composite waveform which is a new sound) by moving their locations on the screen so as to synchronize selected parts of the waveforms in time. Also, the system provides means to alter the pitch (i.e., frequency) or amplitude of a particular part of any waveform by moving a segment of a line adjacent to the waveform on the screen, which line corresponds to the pitch or amplitude for the adjacent part of the waveform.

The novel features of the invention include the ability to visually display several waveforms and synchronize them in time so the waveforms can be mixed into a new composite waveform, and the ability to change the pitch and amplitude of portions of a waveform by means of an easy to use visual display.

The system and method of the present invention are applicable to any time domain sampled data. That is, video or other waveforms can also be edited in accordance with the invention in the same manner as are sound waveforms.

Appendix A is the actual computer program of the preferred embodiment of the present invention.

DETAILED DESCRIPTION OF THE INVENTION

Figure 1:
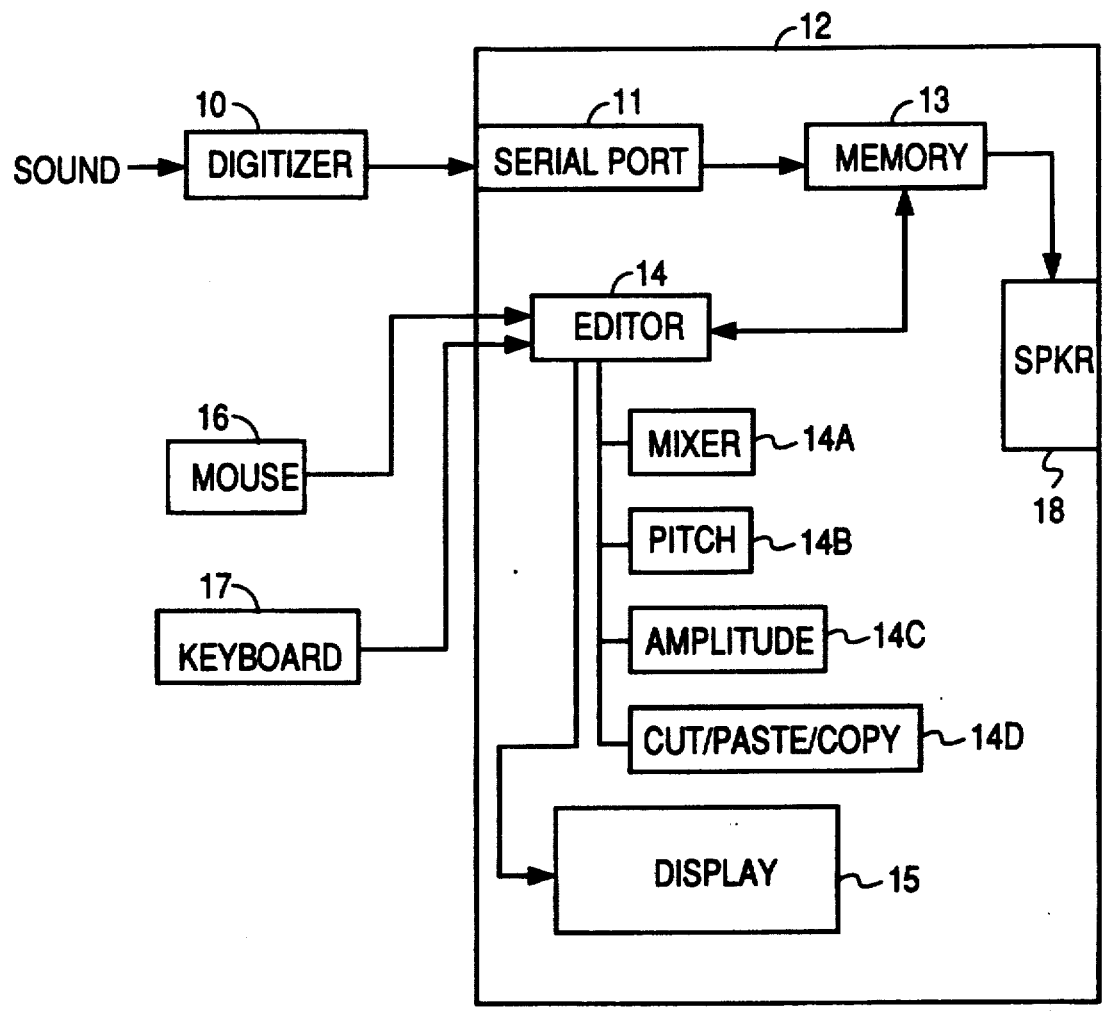
FIG. 1 shows a block diagram of a system incorporating the present invention.

The preferred embodiment of the present invention is a hardware and software system as shown in FIG. 1 for the Apple Macintosh family of computers, that allows the user to record, edit, and play back sound such as speech, noise, or music. The system includes a sound input device (a digitizer 10) described in copending application Ser. No. 07/291,808, entitled Self Powered Analog to Digital Converter, filed Dec. 29, 1988, and assigned to Farallon Computing, the assignee of this application, and several application programs, one of which is a sound editor program. This copending application is hereby incorporated by reference. The system of this invention allows sound to be recorded live or from other audio sources. The system is then used to edit the sounds. As many waveforms can be recorded as there is room in computer memory.

The digitizer 10 described in application Ser. No. 07/291,808 is a sound input device that allows one to record and store sound. The digitizer may be used with the sound editor application program of this invention. The digitizer 10 has a built-in microphone, microphone jack, line jack, and an input level control knob (not shown). It includes a separate 10-foot audio cable to record from a stereo, tape deck, compact disk, or any similar sound system.

The digitizer 10 preferably plugs into a serial port 11 (modem or printer port) of the Macintosh computer 12, derives its power from this port through the Macintosh computer, and provides the digitized electric signals representing the sound waveform to the computer. These digitized signals representing the waveform are conventionally stored in the computer memory 13. Many such waveforms may be so stored.

FIG. 1 also shows the sound editor 14 with its subelements the mixer 14A, pitch control 14B, amplitude control 14C, and cut/paste/copy functions 14D, all described below. The computer display 15 and mouse 16 and keyboard 17 and loudspeaker 18 are conventional.

Figure 2:
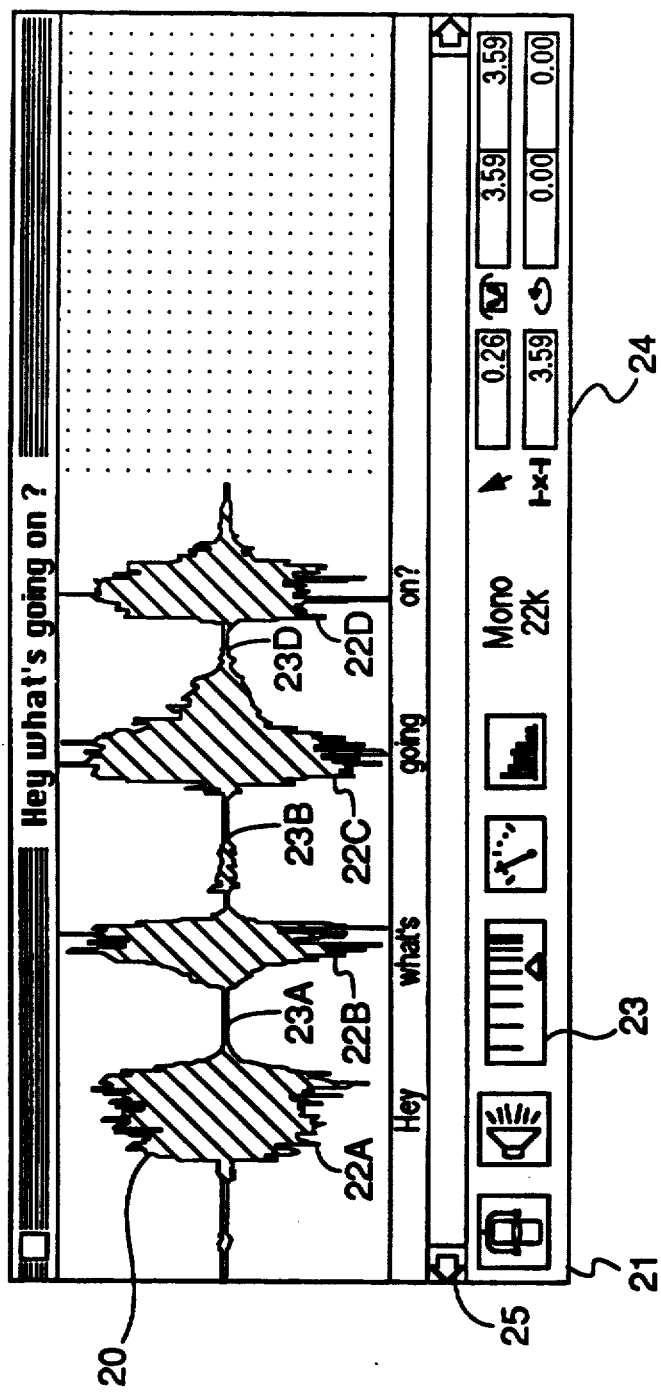
FIG. 2 shows a screen display of a waveform representing monaural sound in the preferred embodiment of the present invention.

FIG. 2 is a typical display of a waveform 20 representing sound as it appears in a sound editor "window" 21 (i.e., computer screen display). When viewing a sound waveform 20 on the screen of the display associated with the Macintosh Computer 12 (see FIG. 1), the user typically adjusts the resolution by means of the resolution control 23 (third box from left at the bottom of the window 21 in FIG. 2) so as not to see the individual cycles of the waveform 20; the user then sees only the envelope of the waveform 20. This envelope information is useful because it identifies the loud portions of the sound. In the FIG. 2 waveform 20 of a spoken sentence, the large dark regions 22A, 22B, 22C, 22D indicate the location of each word in the sentence and the spaces 23A, 23B, 23C between these dark regions indicate silences between words.

In the sound editor 14 (of FIG. 1), the user preferably employs a mouse 16 or similar device to select a part of the waveform (the large dark regions 22A, 22B, 22C, 22D) in order to play them or to cut, copy, or paste them as is done conventionally with words in a text document. The user can also select part of a waveform 20 and apply one or more special effects to it.

The sound editor 14 (see FIG. 1) (which is preferably an application program) lets the user record, edit, store, and play back monaural and stero sound. A sound is typically represented by a waveform; several waveforms can be combined (i.e., mixed) to make a new sound represented by a waveform. The sound editor 14 has the capability to: enhance a sound by adding special effects, such as smoothing, silence, an echo, or a filter; generate new sounds; mix up to four sounds at once to create a new sound; alter pitch or volume of part of a sound; and select a portion of the sound and delete, move (i.e., cut and paste) or copy it to another place in the waveform.

A sound is displayed graphically as a waveform in the sound editor window. FIG. 2 shows a monaural sound waveform 20 in window 2).

Figure 3:
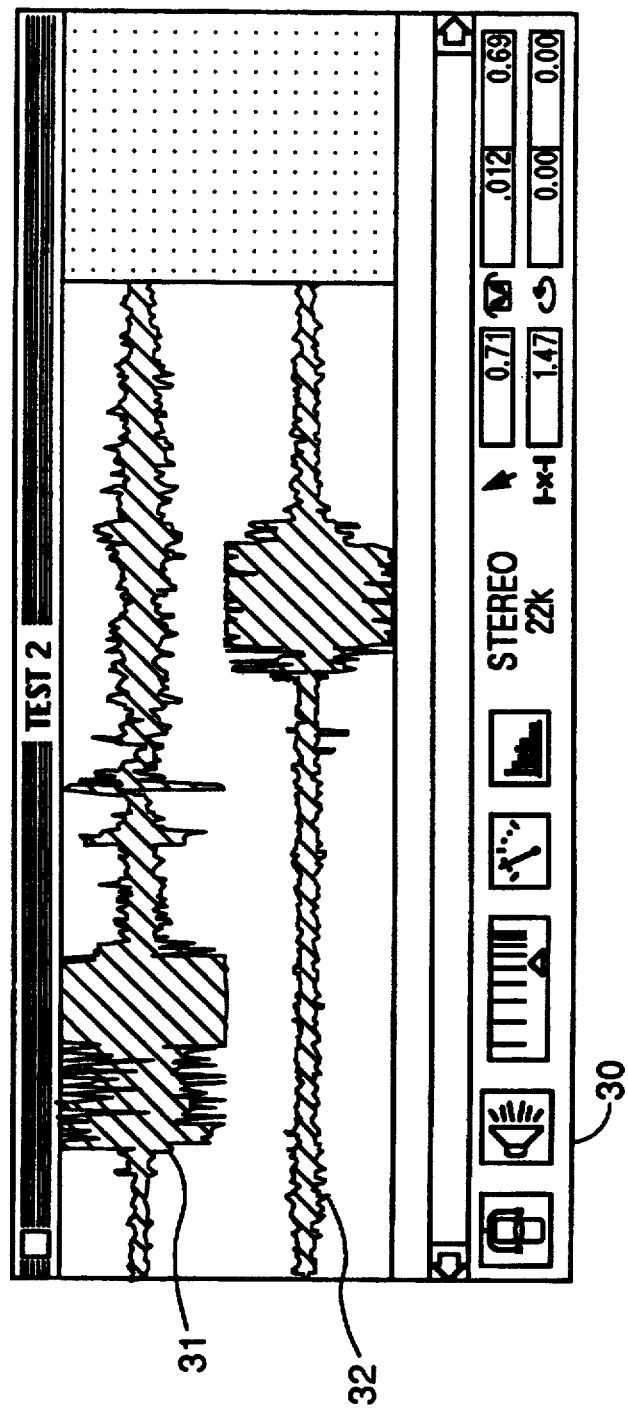
FIG. 3 shows a screen display of two waveforms representing stereo sound in the preferred embodiment of the present invention.

The sound editor 14 (see FIG. 1) displays the waveforms for both channels of a sterophonic (or other multichannel such as quadraphonic) sound. The left channel is preferably displayed in the top half of the window and the right channel is displayed in the bottom half of the window. FIG. 3 shows how the two waveforms 31, 32 representing the two channels of stereo sound appear in a window 30.

If a sound waveform is too long to fit into the sound editor window, the user (see FIG. 2) employs the horizontal scroll bar 25 (located at the bottom of the window 21) to scroll the waveform 20 in the window 21, just as one scrolls additional information in other well-known Macintosh windows.

The object of the mixer 14A (see FIG. 1) of the present invention is conventional in that several separate sounds, each represented by one or more waveforms, can be combined by a user into a single sound. For instance, when making the soundtrack for a movie, the director may wish to mix a section of background music with someone's voice, some footsteps and a gun shot. These four sounds would be recorded separately, each as a separate waveform) then the mixer would be used in accordance with the present invention to align properly the waveforms representing these sounds, adjust the amplitudes of each of these waveforms, and then mix them into a composite sound represented by a new waveform for the final result. Aligning means "placing" a particular sound, such as the gun shot sound, so it occurs at a desired point in time; for instance, between two footsteps. Amplitude means loudness, so the music fades in or out as its amplitude is varied, the gun shot is adjusted to be loud, and the footsteps are adjusted to be soft.

Figure 4A:
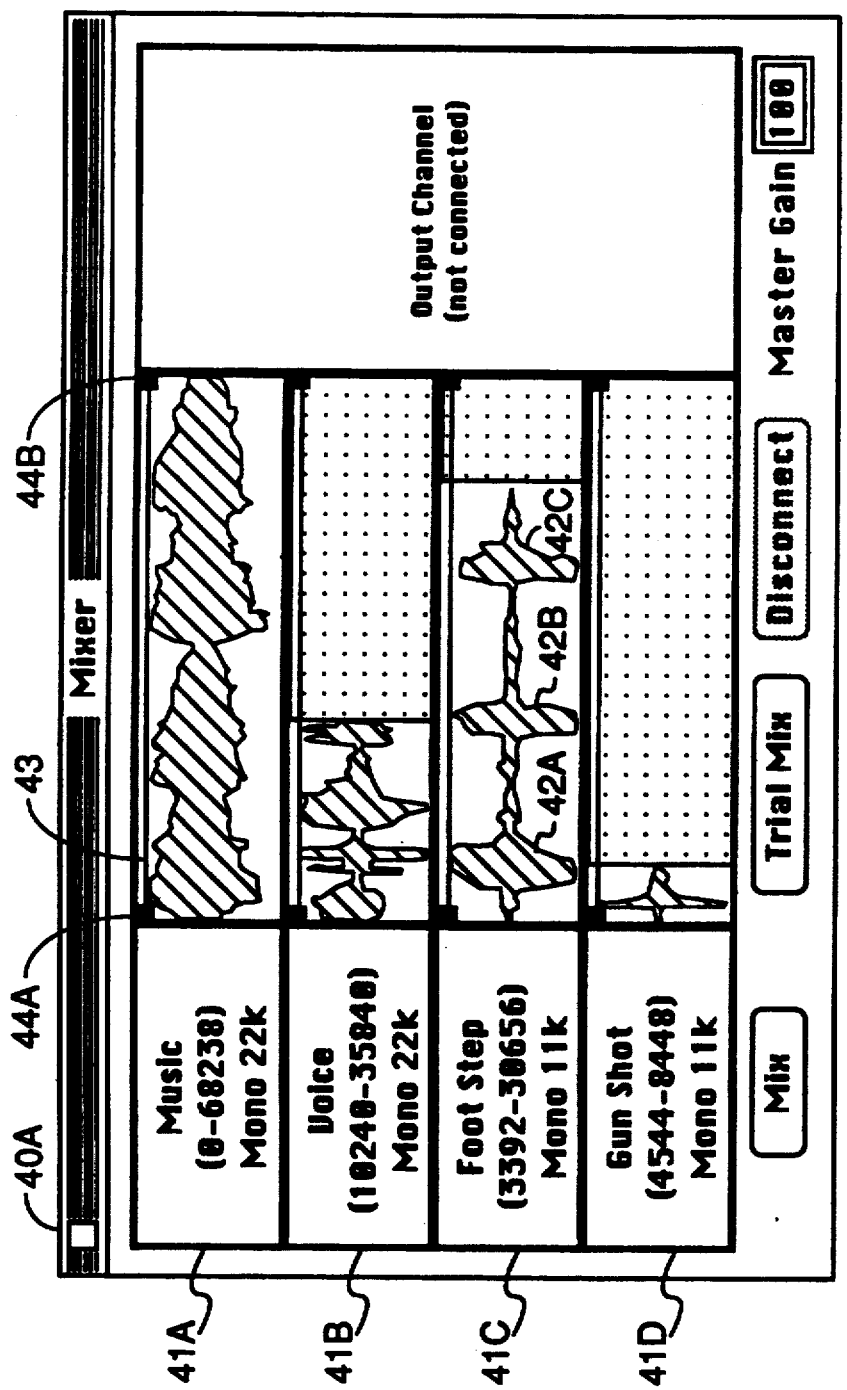
FIGS. 4A and 4B shows screen displays of several sound waveforms for mixing in the preferred embodiment of the present invention.
Figure 4B:
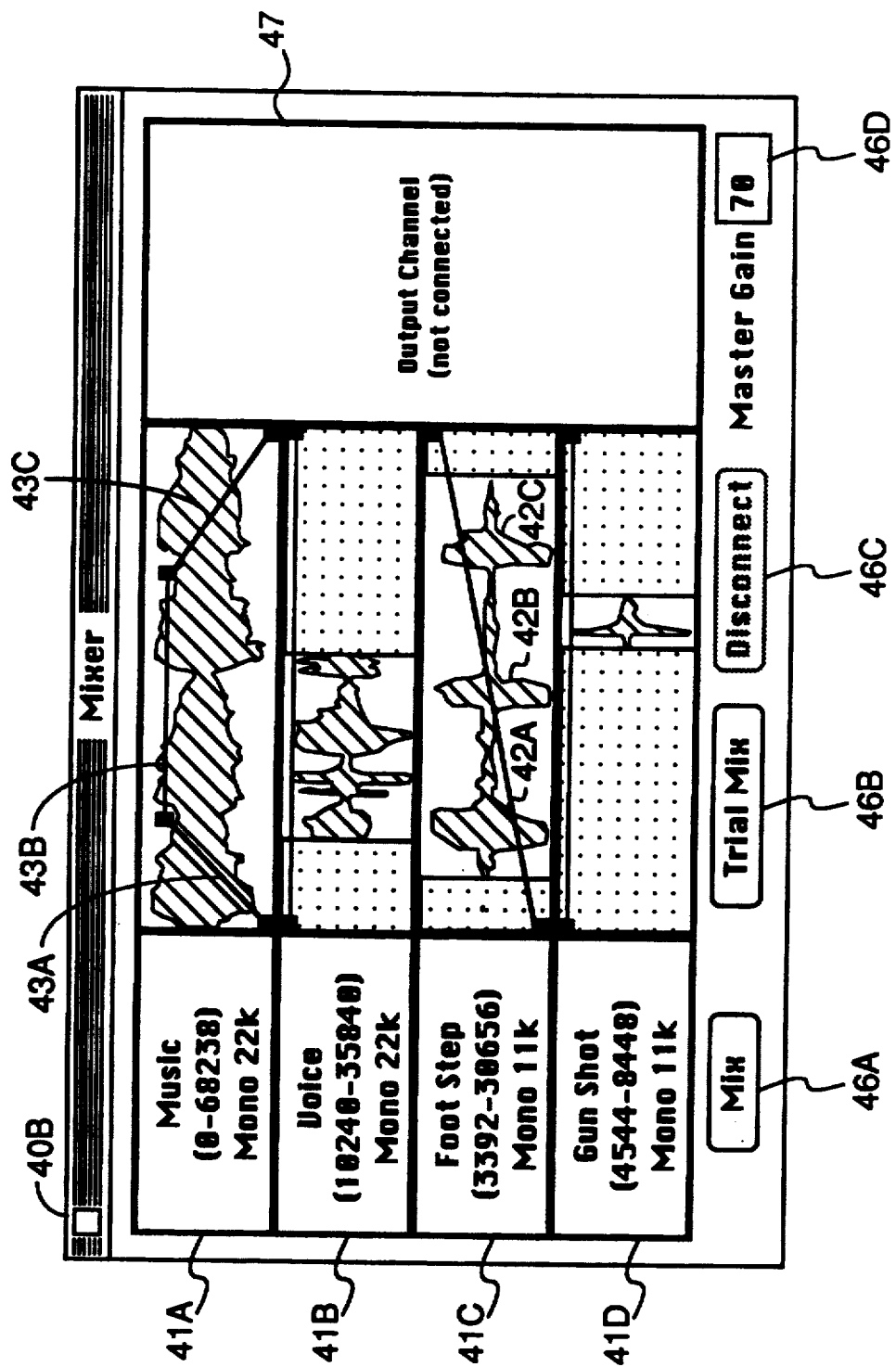

FIGS. 4A and 4B show, respectively, two Mixer windows (i.e., screen displays) 40A, 40B of the sound editor 14. In each window there are four rows, one for each of up to four recorded sounds (i.e., up to four sound waveforms which are shown in grey) mentioned above (Music 41A, Voice 41B, Foot Steps 41C and Gun Shot 41D). When the user inputs the waveform representing a sound to the Mixer 14A (for instance by using the digitizer as described above), the waveform is automatically inserted into the next available row. To display the Mixer window 40A, the user selects Show Mixer in a conventional way using a menu (not shown). In the left column in FIGS. 4A and 4B is displayed some information about each sound, including its length and its sampling rate. The larger grey regions of the waveform in each row indicate where the sound is loud; for instance, in Foot Steps 41B, there are three clearly distinguishable regions 42A, 42B, 42C, suggesting that three footsteps are heard. Near the top of each of the four rows in FIG. 4A, there is a solid horizontal dark line (such as line 43A in the Music row 41A) terminated by a small solid square 44A, 44B (a "knot") at each end. This dark line 43 is the amplitude control line.

By pointing and clicking with the mouse 16 of FIG. 1, the user (see FIGS. 4A, 4B) can slide the amplitude control line 43 up and down in linear segments; the effect is that of a rubber band that the user grabs at any point and pegs down with a square (i.e., a knot such as 44B). The user clicks on the amplitude control line 43 to create additional knots, so as to create a new line segment in the amplitude control line. Knots such as 44A, 44B (FIG. 4A) are deleted by dragging them off the window 40A. For instance, in FIG. 4B in the Music waveform, the amplitude control line 43 has three line segments 43A, 43B, 43C. The amplitude control line 43 has been adjusted by the user so that it starts low, sweeps up, stays level, then sweeps low again. Upon mixing, the Music will correspondingly start soft, fade in, play at a constant volume for a while, then fade out. Similarly, in Foot Steps, in FIG. 4B, the amplitude control line 45 starts low and sweeps high, which will cause the mixed result to slowly fade in the footsteps. Thus, the user has detailed and easy-to-use control of the amplitude of the sounds to be mixed.

To control the alignment of the waveforms representing the sounds, the user simply conventionally clicks on the waveform using the mouse and slides the waveform left or right until it is positioned correctly. For instance, in FIG. 4B the Voice 41B is now shifted to the right, so it will start to play some time after the Music 41A has started. Also, the Gun Shot 41D will sound between the second Foot Step 42B and third Foot Step 42C (FIG. 4B).

By clicking on the "Trial Mix" button 46B (FIG. 4B), the user can hear through the loud speaker 18 what the mixed sound will sound like in rough form without actually performing the mix. "Mix" 46A actually does the mixing. The mixed sound (not shown) is output to the destination specified by the user in the output box 47 on the right side of window 40B as shown in FIG. 4B. If no mixer output destination is specified, the mixed sound will be inserted into a new untitled window (not shown). The user then displays the new untitled window to display the mixed sound. "Disconnect" 46C removes a selected waveform from the mixer window. "Master Gain" 46D allows the user to adjust the final amplitude of the result. Stereo sounds (and other multichannel sounds such as quadraphonic) and sounds of different sampling rates may all be mixed. Stereo sounds are displayed as two waveforms (one for each channel) in each row. Each waveform of a stereo sound can be edited independently. Stereo sounds may be output as monaural, and sound input as monaural may be output as two identical stero channels. The computer program that performs the mixing in the preferred embodiment is shown in Audio Mix.c, pages 1-14 of Appendix A.

The "Bender" effect (see FIG. 5) adjusts the pitch of a sound by an amount that can vary along the length of the sound. When the user chooses the Bender effect, the sound selected appears as a waveform 51 in the screen display dialog box 50 as shown in FIG. 5.

Figure 5:
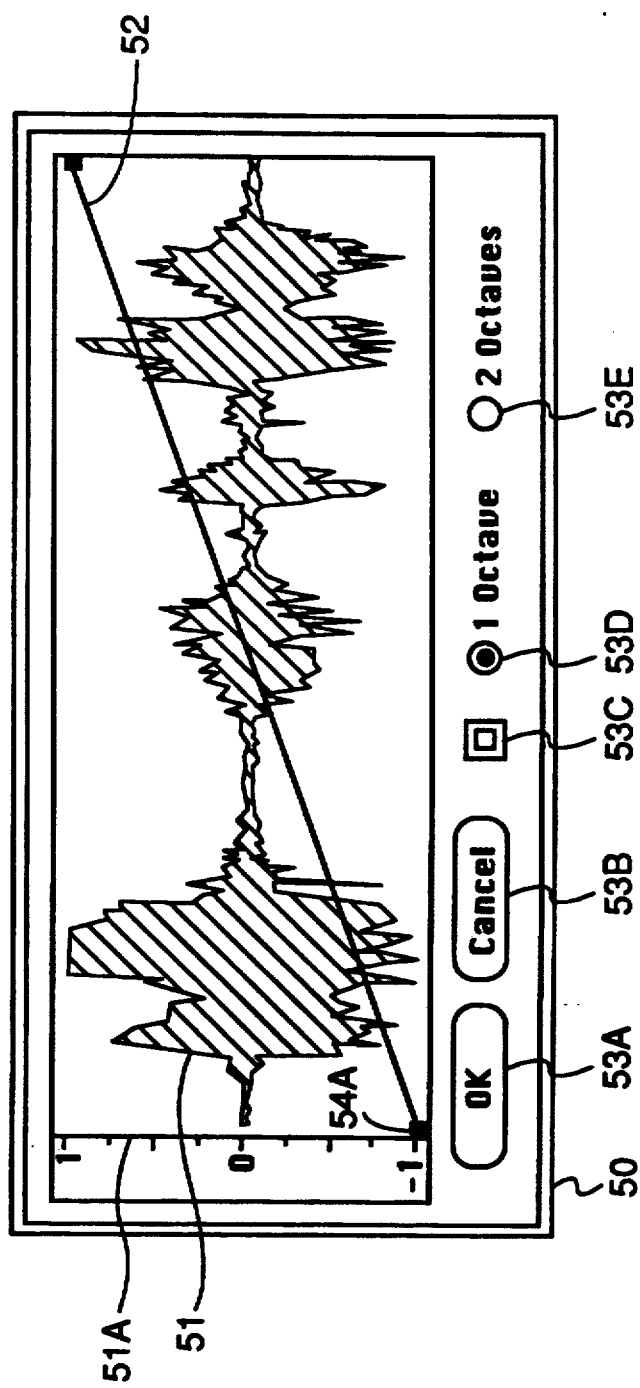
FIGS. 5 and 6 show screen displays useful in adjusting pitch in the preferred embodiment of the present invention.

The waveform 51 is shown in grey in FIG. 5. The solid horizontal dark pitch control line 52 indicates how the pitch is to be edited at each point along the waveform 51. In this example, the first part 51A (left-hand portion) of the waveform 51 will have its pitch lowered by an octave while the last part 51B (right-hand portion) of the waveform 51 will have its pitch raised by an octave with everything in between adjusted proportionately. The buttons 53A, 53B, 53C, 53D, 53E located at the bottom of the window 50 adjust the scale 51A to the left of the waveform 51. For instance, if the user checks the button 53E labeled "2 Octaves," this action raises or lowers the pitch by as much as two octaves instead of only one.

The user moves (i.e., displaces) the pitch control line 52 with the mouse 16 (see FIG. 1) by clicking the mouse on a knot such as 54A (as described above) and dragging the knot on the window by moving the mouse 16 in the direction in which the knot is to be moved. Clicking the mouse 16 on the pitch control line 52 creates additional knots (not shown). The square 53C with a knot in it to the right of the Cancel button 53B is a knot "well" which is a second source of additional knots. One can also click in the knot well 53C and drag new knots onto the pitch control line 52. The user drags knots off the window 50 to remove them by clicking the mouse 16 on a knot and dragging the knot to the edge of the window.

Figure 6:
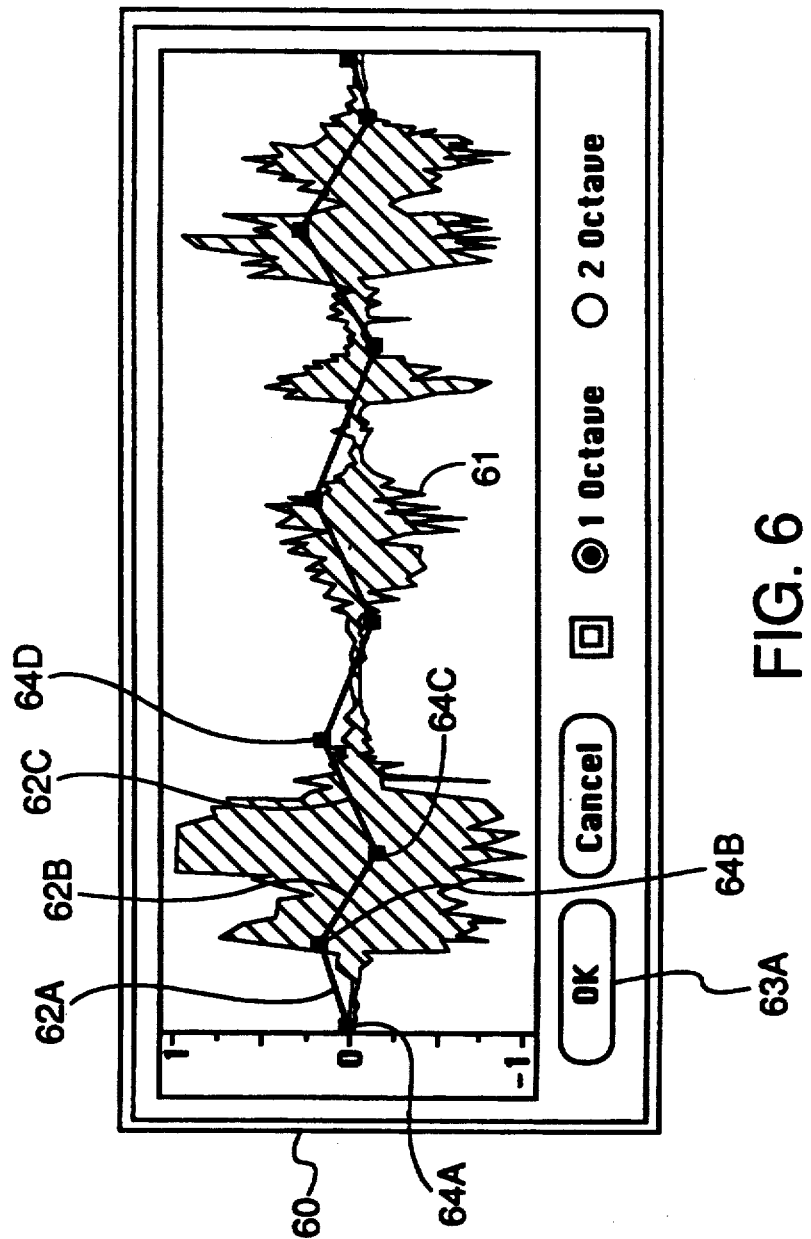

To add a tremolo (i.e., a varying pitch) to a sound, (see FIG. 6) the user adds knots such as 64A, 64B, 64C, 64D, etc. to pitch control line 62 and then displaces line segments 62A, 62B, 62C, 62D, etc. of the pitch control line 62 (as described above) as shown in FIG. 6 so that the pitch control line varies in up and down fashion. The program implementing the Bender effect in the preferred embodiment is shown in Appendix A at Bender.c, pages 1-8.

The user clicks the OK button 63A to adjust the pitch of the waveform 61 in computer memory 13 (FIG. 1), as indicated on the window 60.

The "Envelope" effect (see FIG. 7) adjusts the volume of a sound by an amount that varies over the length of the waveform, somewhat similarly to the amplitude control method described above in connection with the Mixer window in FIG. 4B. The user employs the Envelope effect together with the conventional noise or tone generator effects to make bursts of sound that fade in or die out at any desired speed. The Envelope effect also is used to change portions of musical sounds. For example, one can gradually incrase the volume of the percussive strike of a piano key resulting in a "bowed" piano sound.

Figure 7:
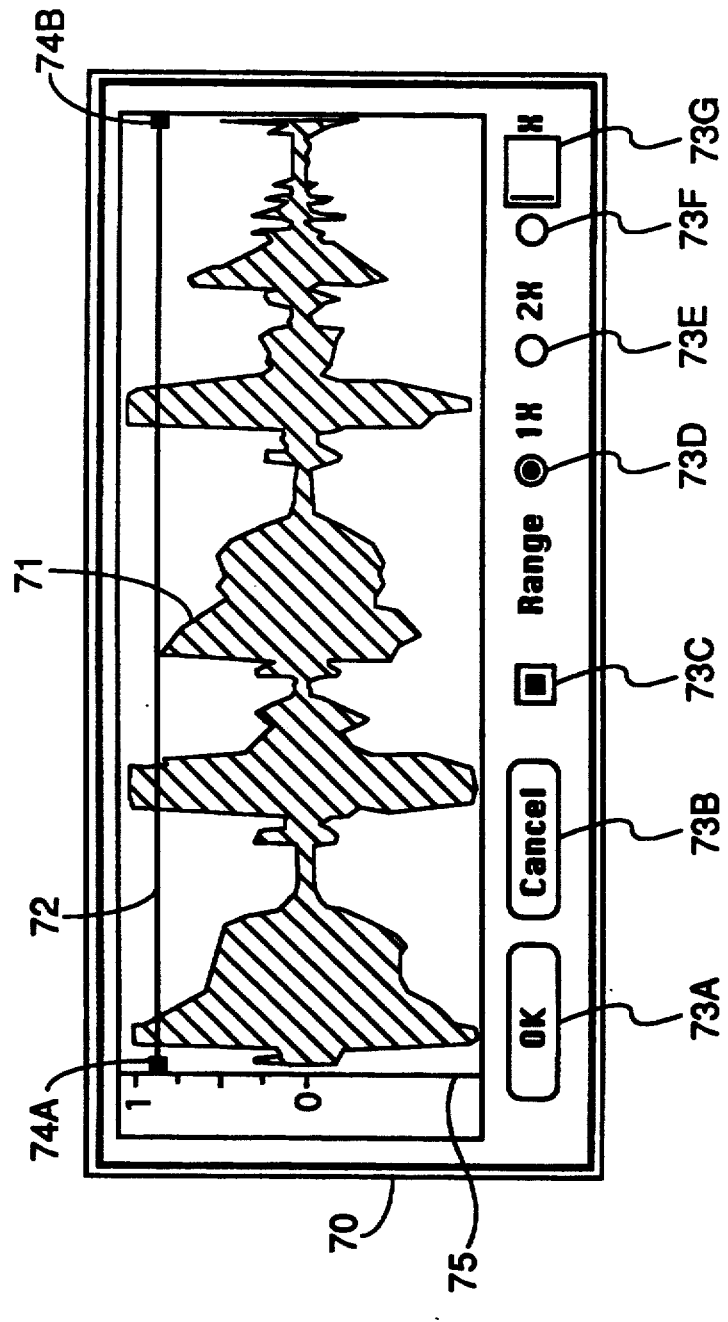
FIG. 7 shows a screen display useful in adjusting volume in the preferred embodiment of the present invention.

Selecting the Envelope effect displays the screen display dialog box 70 (i.e., window) as shown in FIG. 7.

The window 70 of FIG. 7 is similar to the Bender window described above. The waveform 71 is drawn in grey on the background, and there is a solid horizontal dark amplitude control line 72 with knots 74A, 74B on the line. The amplitude control line 72 indicates by its displacement from the horizontal how the volume will be altered at each point in the waveform 71. The user moves the amplitude control line 72 with the mouse by clicking on a knot such as 74A and dragging it. The user clicks on the amplitude control line 72 to create additional knots. The square 73C with a knot in it to the right of the Cancel button 73B is a knot "well." The user can also click in the knot well 73C and drag new knots from the well 73C onto the amplitude control line 72. Dragging knots off the window 70 removes them as described above.

The vertical scale 75 along the left side of the dialog box 70 indicates the factor by which the amplitude of the sound will be adjusted. Scaling the amplitude by 1 leaves the volume unchanged from its recorded level, scaling it by 2 doubles the volume of the sound, etc. The scale is adjusted using the buttons at the bottom of the dialog box. If the user checks the "1X" button 73D, the scale ranges between zero (silence) and 1 (100% amplitude). If the user checks the "2X" button 73E, the scale ranges between zero and 2 (200% amplitude). This setting permits the user to make a sound up to twice as loud. The user can also check the rightmost button 73F and enter an integral scaling factor in the edit box 73G. This makes a sound arbitrarily louder by the scaling factor.

The amplitude control line 72 and the knots 74A, 74B do not move below the middle of the window, which corresponds to zero amplitude, or silence. The amplitude control line 72 represents the top half of a symmetrical envelope curve. The computer program implementing the Envelope effect is shown in Envelope.c, pages 1-7, in Appendix A.

The above description of the invention is in the context of the well known Macintosh computer 12 (FIG. 1). The sound editor 14 as described above is implemented as a conventional application program installed in the computer 12. In its preferred embodiment, the sound editor 14 is written partly in the C-language and partly in assembly language as shown in Appendix A. The sound editor 14 operates conventionally insofar as mouse 16 and keyboard 17 manipulations by the user of the displayed waveforms and other sound characteristics are captured by the computer 12 and used to modify the digitized data stored in the computer memory 13 representing the waveform.

As discussed above, waveforms other than sound can also be edited in accordance with the present invention. For instance, a video waveform would be input to the computer by means of an appropriate analog to digital digitizer, and then edited as described above with regard to sound waveforms. In this case, the "Bender" effect instead of altering pitch would alter some other desired sampling state, such as a color.

The present invention is implementable in other embodiments on computers other than the Macintosh, and is also implementable in a special purpose sound editing device embodiment. Other modifications to the invention will be apparent to one of ordinary skill in the art in light of the above description.

```
SoundTrack source (AudioMix.c)
©1987 Farallon

Written by Steve Capps with a lot of help from:
    Mike Lamoureux, Sam Roberts & Joe Sensendorf Modification History:
---------------------

<JS  05/18/88>  Moved MixRect to AudioMisc.c so Mixer segment isn't loaded during
                initialization.
<SC  05/31/88>  Trial Mix bug fix.
<SMR 09/09/88>  If the right channel of a stereo wave is a monophonic mixer input,
                point the Play4List entry to the right channel, not the left channel,
                in MixEvent.
<SMR 09/11/88>  Initialize Play4List delays to the largest positive 32-bit integer
                in MixEvent so empty channels never start playing. If the beginning
                of the selection is past the end of the channel to be played by a
                trial mix, set the Play4List delay to the largest positive 32-bit
                integer in MixEvent so that the channel doesn't play. Pin the end of
                the selection if it is past the end of the channel to be played by
                a trial mix.
<SMR 09/27/88>  Added MixLabel to tell if a label is associated with the mixer and
                MixLabelKill to disassociate a label from the mixer.
<SMR 10/01/88>  If w->activeLabel2B is -1 in MixSetup, try to match selection to
                a label. Replaced MixLabel with MixLabelRenew since more than one
                channel of the mixer may reference the same label. MixLabelRenew
                calls MixRenew for each channel that references a label.
*/ include "AudioDefs"

define fudge 6

/*Procedures*/

MixBox( GWindPeek, short, Rect * );
                MixDeltoid( void );
                MixDown( void );
                MixDrawBits( short );
pascal void     MixDrawProc( DialogPtr, short );
                MixInvert( short );
                MixPlot( GWindPeek, short );

KillMixer( )
{
#if 0
    DisposDialog( mixer );
    /* knots, bits etc. */
    mixer = NIL;
    mixActive = False;
    mixSelect = 0;
    /*nMixed = 0;*/
#endif
    HideWindow( mixer );
    mixVisible = False;
}

MixActivate( act )
short   act;
{
    if ((mixer) && (mixActive != act)) {
        mixActive = act;
        MixInvert( mixSelect );

if (act)
            TEActivate( ((DialogPeek)mixer)->textH );
        else
            TEDeactivate( ((DialogPeek)mixer)->textH );
    }
}

MixBox( w, mix, r )
register GWindPeek  w;
short               mix;
Rect                *r;
{
    char    str[64], num[32];
    short   index;

EraseRect( r );
```

```
    if (w /*&& ((mix < nMixed) || mix == mixOut)*/) {
        TextFont( 0 );              /* title in Chicago */
        TextSize( 0 );

InsetRect( r, 2, 6 );

r->bottom = r->top + 16;
        TextBox( &w->name[1], w->name[0], r, teJustCenter );

TextFont( 1 );              /* rest in app font */
        TextSize( 9 );
        str[0] = 1;
        str[1] = '(';
        if (mixes[mix].label >= 0) {
            AddStr( str, (*w->labels + mixes[mix].label)->text );
        }
        else {
            Number( w, mixes[mix].beg, num );
            AddStr( str, num );
            AddChar( str, '-' );
            Number( w, mixes[mix].end, num );
            AddStr( str, num );
        }
        AddChar( str, ')' );
        OffsetRect( r, 0, 18 );
        TextBox( &str[1], str[0], r, teJustCenter );

index = 39;                 /* assume MONO */
        if (w->info[mode]) {
            index = 40;             /* assume Stereo */
            if (mixes[mix].chanFirst == mixes[mix].chanLast)
                index = mixes[mix].chanFirst ? 38 : 13;    /* right or left */
        }
        GetIndString (str, 100, index );

NumToString( maxFactor/w->info[rate]/1000, num );
        AddChar( str, ' ' );
        AddStr( str, num );
        AddChar( str, 'K' );

OffsetRect( r, 0, 12 );
        TextBox( &str[1], str[0], r, teJustCenter );

}
    else {
        TextFont( 1 );              /* rest in app font */
        TextSize( 9 );
        if (mix == mixOut)
            GetIndString (str, 100, 49 );   /* Output channel */
        else {
            GetIndString (str, 100, 48 );   /* Input channel */
            NumToString( mix+1, num );
            AddStr( str, num );
        }
        GetIndString (num, 100, 50 );   /* Not connected */
        AddStr( str, num );
        InsetRect( r, 0, 14 );
        TextBox( &str[1], str[0], r, teJustCenter );
    }
    TextFont( 0 );                  /* title in Chicago */
    TextSize( 0 );
} short MixDeltoid()
{
    register short   mix, skip;
    Fixed            delta, minDelta;

short            minSkip;
    long             diff;

if (nMixed == 0) {
        mixDelta = 0x7FFFFFFF;
        mixSkip = 1;
    }
    else {
        mixes[mix].end = mixes[mix].end;
        minDelta = 0x7FFFFFFF;
        for (mix=0;mix<nMixed;mix++) if (diff = (mixes[mix].end - mixes[mix].beg)) {
            skip = 1;
            delta = (((long)mixWidth+1) << (16+fudge)) / (diff * mixes[mix].sRate);
            while (True) {
                if (delta*skip > 0x00004000) break;
                skip <<= 1;
            }
```

```
            if (delta < minDelta) {
                minDelta = delta;
                minSkip = skip;
            }
        }
        if (mixDelta != minDelta) {
            mixDelta = minDelta;
            mixSkip = minSkip;

for (mix=0;mix<nMixed;mix++) {
                skip = ((mixes[mix].end - mixes[mix].beg) * mixDelta * mixes[mix].sRate) >> (16+fudge);
                skip = mixWidth+mixH - (mixes[mix].wave.left + skip);
                if (skip < 0) OffsetRect( &mixes[mix].wave, skip, 0 );
                /*OffsetRect( &mixes[mix].wave, -mixes[mix].wave.left+mixH, 0 );*/
                MixPlot( mixes[mix].wind, mix );
            } return(True);
        }
    }
    return(False);
}

MixDisconnect( mix )
register short  mix;
{
    register short  i;
    Rect            r;

if (mix == mixOut) {
        MixRenew( mixOut );
        mixes[mixOut].wind = NIL;
    }
    if (mix<nMixed) {
        nMixed--;

DisposHandle( mixes[mix].bits );
        KnotKill( &mixes[mix].knots );

BlockMove( &mixes[mix+1], &mixes[mix], (nMixed - mix)*sizeof(MixTrack) );

for (i=mix;i<nMixed;i++) {
            OffsetRect( &mixes[i].wave, 0, -mixSpacing );
            KnotOffset( &mixes[i].knots, 0, -mixSpacing );
            MixRenew( i );
        }
        MixRect( nMixed, &r );
        InsetRect( &r, 0, knotIndent );
        KnotInit( &mixes[nMixed].knots, &r );
        MixRenew( nMixed );

mixes[nMixed].wind = NIL;
        mixes[nMixed].bits = NIL;

MixDeltoid();             /* in case minDelta was disconnected */
    }
}

MixDown()
{
    register long   samp, destAdd;
    register short  value;
    long            start[nMixers], count[nMixers], offset[nMixers];
    unsigned char   *waveA[nMixers], *waveB[nMixers], c, cB;
    short           knot[nMixers], monoMix[nMixers], ampStart[nMixers];
    Point           prevPt[nMixers], knotPt[nMixers];
    Fixed           slope[nMixers], horz;
    register short  mix;
    register GWindPeek  w;
    Ptr             dest;
    GWindPeek       destWind;
    short           amp;
    long            l, destCut, countless, destMode, amt;
    short           i, x, selfMix;
    short           virgin;
    short           incs[nMixers];
    short           destInc, destRate, destStereo;
    long            realBeg[2];
    Handle          reserve;

WatchCursor();

x = GetNumItem( mixer, 13, 0, 1000 );
    SetNumItem( mixer, 13, x );
    SelIText( mixer, 13, 0, 1111 );
    mixMaster = x * 128L / 100;
```

```
virgin = False;
destWind = mixes[mixOut].wind;
if (!destWind) {                          /* if no dest specified create one */
    destWind = mixes[mixOut].wind = NewDocument( "\p", 0, "\p" );
    if (!destWind) return;

destWind->info[compress] = 0;         /* can't be compressed */

MixSetup( destWind, mixOut );         /* dest is last one */
    virgin = True;
} destMode = destWind->chanFirst != destWind->chanLast;   /* what kind of dest ? */
destRate = destWind->info[rate];

destAdd = 0;
selfMix = -1;
for (mix=0;mix<nMixed;mix++) {
    w = mixes[mix].wind;

if (w == destWind) selfMix = mix;

start[mix] = (((long)(mixes[mix].wave.left - mixH)) << (16+fudge)) / mixDelta;
    count[mix] = mixes[mix].end - mixes[mix].beg;
    l = count[mix] * mixes[mix].sRate;
    if (l > destAdd) destAdd = l;

offset[mix] = 0;
} destCut = mixes[mixOut].end - mixes[mixOut].beg;
destAdd /= destRate;        /* destAdd should be rate adjusted */ amt = destAdd - destCut;
if (destMode) amt *= 2;

if (CheckMemory( amt, 16 )) { reserve = NewHandle( amt );

if (UndoPrep( destWind, 16, mixes[mixOut].beg, mixes[mixOut].end, False )) {
        virgin = False;
        WatchCursor();

DisposHandle( reserve );

for (i=mixes[mixOut].chanFirst;i<=mixes[mixOut].chanLast;i++) {
            realBeg[i] = mixes[mixOut].beg;

l = GetHandleSize( destWind->data[i] );
if (l < mixes[mixOut].beg) realBeg[i] = l;

if (selfMix >= 0) {
    UndoModify( mixes[mixOut].beg, destAdd );
    /*UndoInsert( mixes[mixOut].beg, destAdd );*/ l = destAdd - (l - realBeg[i]);
    if (l > 0) {
        InsertFill( destWind->data[i], realBeg[i], l, 0x80 );

/* if source is dest, bump over */
        for (mix=0;mix<nMixed;mix++) if (mixes[mix].wind == destWind) {
            offset[mix] = l;
        }
    }
}
else {
    UndoInsert( mixes[mixOut].beg, destAdd );
    SafeReplace( destWind->data[i], mixes[mixOut].beg, destCut, (Ptr)l, destAdd );
} countless = destAdd * destRate;

dest = *destWind->data[i] + realBeg[i];
destInc = destRate;

for (mix=0;mix<nMixed;mix++) {
    w = mixes[mix].wind;
    /* see if stereo->mono mix */
    if (monoMix[mix] = ((mixes[mix].chanFirst != mixes[mix].chanLast) && !destMode) )
        x = 0;
    else
        x = (i == destWind->chanFirst) ? mixes[mix].chanFirst : mixes[mix].chanLast;

waveA[mix] = (unsigned char *)(*w->data[x] + mixes[mix].beg + offset[mix]);
    waveB[mix] = (unsigned char *)(*w->data[1] + mixes[mix].beg + offset[mix]);
```

```c
/* assume conversion rate is max */
incs[mix] = mixes[mix].sRate;

/* set count again in case we go around 2x */
count[mix] = mixes[mix].end - mixes[mix].beg;

/* adjust count if wave is too short */
l = GetHandleSize( w->data[x] ) - mixes[mix].beg;
if (l < 0) l = 0;
if (l < count[mix]) count[mix] = l;

knot[mix] = 1;
knotPt[mix] = *(*mixes[mix].knots.pts);

} samp = 0;
horz = 0;

value = 0;
while (countless--) {
    for (mix=0;mix<nMixed;mix++) {
        if ((samp >= start[mix]) && count[mix]) {
            if ((horz >> (16+fudge)) >= knotPt[mix].h) {
                if (knot[mix] < mixes[mix].knots.nKnots) {
                    prevPt[mix] = knotPt[mix];
                    while (True) {
                        knotPt[mix] = *(*mixes[mix].knots.pts + knot[mix]++);
                        if (knotPt[mix].h != prevPt[mix].h) break;
                    } slope[mix] = (((long)(prevPt[mix].v - knotPt[mix].v)) << 16) /
                                    (knotPt[mix].h - prevPt[mix].h);
                    amp = ((((horz >> (16+fudge)) - prevPt[mix].h) * slope[mix]) >> 16);
                    amp += mixHeight - (prevPt[mix].v);
                    ampStart[mix] = amp;
                }
            }
            if (slope[mix]) {           /* is there slope ? */ amp = ((((horz >> (16+fudge)) - prevPt[mix].h) * slope[mix]) >> 16);
                amp += mixHeight - (prevPt[mix].v);
            }
            else
                amp = ampStart[mix];

if (monoMix[mix]) {
                c = *waveA[mix];
                cB = *waveB[mix];
                if (--incs[mix] == 0) {
                    incs[mix] = mixes[mix].sRate;
                    waveA[mix]++;
                    waveB[mix]++;

count[mix]--;
                }
                asm {
                    MOVEQ   #0,D0
                    MOVE.B  c(A6),D0
                    MOVEQ   #0,D1
                    MOVE.B  cB(A6),D1
                    ADD     D1,D0
                    SUB     #256,D0
                    ;ASR    #1,D0       /* no auto divide */

MULS    amp(A6),D0
                    DIVS    #48,D0
                    ADD     D0,value
                }
            }
            else {
                c = *waveA[mix];
                if (--incs[mix] == 0) {
                    incs[mix] = mixes[mix].sRate;
                    waveA[mix]++;

count[mix]--;
                }
                asm {
                    MOVEQ   #0,D0
                    MOVE.B  c(A6),D0
                    SUB     #128,D0
                    MULS    amp(A6),D0
                    DIVS    #48,D0
                    ADD     D0,value
                }
            }
```

```
            }
        }
        if (--destInc == 0) {
            /*
            value = ((value * (long)mixMaster) / 100 ) + 128;
            if (value > 255) value = 255;
            if (value < 0) value = 0;
            */
            asm {
                MULS    mixMaster(A5),value
                ASR.L   #7,value
                DIVS    destRate(A6),value
                ADD     #128,value
                BPL.S   @pinLo
                MOVEQ   #0,value
            @pinLo
                CMP     #255,value
                BLE.S   @pinHi
                ST      value
            @pinHi
                MOVE.L  dest,A0         ; *dest++ = value;
                MOVE.B  value,(A0)
                ADDQ.L  #1,dest
            } destInc = destRate;
            value = 0;
        } samp++;
                    horz += mixDelta;
                } /* sample loop */ if (selfMix >= 0) {
                    SetHandleSize( w->data[i], realBeg[i] + destAdd );
                }
            } /* each dest channel */

/* cleanup mix ranges, for incestuous mixes, reset to 0 */
            if (selfMix >= 0) for (mix=0;mix<nMixed;mix++) if (mixes[mix].wind == destWind) {
                l = destAdd - mixes[mix].end;
                if (l < 0) {
                    mixes[mix].beg += l;
                    mixes[mix].end += l;
                }
            }
            destWind->reports[repSelBeg] = mixes[mixOut].beg;
            destWind->reports[repSelEnd] = mixes[mixOut].end - mixes[mixOut].beg+destAdd;
            destWind->reports[repLength] += destAdd-destCut;

FitZoom( destWind );

} /* if undo prep */
        else
            DisposHandle( reserve );

} /* end if memory */
    else
        UndoNone();

if (virgin)                         /* kill it if nothing ever was put in it */
        KillDocument( destWind );
    else {
        ShowWindow( (GrafPtr)destWind );
        SelectWindow( (GrafPtr)destWind );
        InvalDoc( destWind );
        MixRenew( mixOut );
    }
}

MixDrawBits( mix )
short   mix;
{
    BitMap  bm;
    Rect    rSrc, rDst;

MixRect( mix, &rSrc );
    if ((mix < nMixed) && mixes[mix].bits) {
        FillRect( &rSrc, <Gray );

PenNormal();
        bm.rowBytes = mixRowBytes;
        SetRect( &bm.bounds, 0, 0, mixWidth, mixRealHite );
        bm.baseAddr = *mixes[mix].bits;
        rSrc = rDst = mixes[mix].wave;
        OffsetRect( &rSrc, -rSrc.left, -rSrc.top );
        CopyBits( &bm, &thePort->portBits, &rSrc, &rDst, srcCopy, NIL );
```

```
        KnotDraw( &mixes[mix].knots );
    }
    else
        EraseRect( &rSrc );
} pascal void MixDrawProc( dlg, item )
DialogPtr   dlg;
short       item;
{
    Rect    r, copy;
    short   mix;

mix = (item - 2) / 2;                   /* derive mixer number */

GetItemRect( dlg, item, &r );
    copy = r;

if (item == 10) {
        InsetRect( ©, 2, 2 );
        EraseRect( © );
        InsetRect( ©, 0, 80 );
        MixBox( mixes[mixOut].wind, mixOut, © );

if (mixActive) MixInvert( mixSelect ); /* hilite on this one */
    }
    else switch ((item-2) % 2) {
        case 0:                             /* do source name */
            MixBox( mixes[mix].wind, mix, © );
            break;
        case 1:                             /* Draw Bits */
            MixDrawBits( mix );
            break;
    }
    InsetRect( &r, -1, -1 );
    PenSize( 2, 2 );
    FrameRect( &r );                        /* frame it */
    PenNormal();
}

MixEvent( itemHit, evt )
short       itemHit;
EventRecord *evt;
{
    short       mix;
    Point       pt, lastPt;
    Rect        r;
    short       deltaH;
    long        delta;
    BitMap      bm;
    Handle      off;
    short       i;
    long        x;
    long        maxLen, len, offset;
    long        beg, end;
    short       chanToPlay;
    Play4List   mixList;
    register GWindPeek  w;
    char        str[64];

SetPort( mixer );
    pt = evt->where;
    GlobalToLocal( &pt );

mix = (itemHit-2) / 2;

if (itemHit == 1) {
        MixDown();
    }
    else if (((((itemHit-3) % 2) != 0) && (mix < nMixed)) || ((itemHit == 10) && (mixes[mixOut].wind != NIL))) {
        MixInvert( mixSelect );
        MixInvert( mixSelect = itemHit );
    }
    else if ((((itemHit-3) % 2) == 0) && (mix < nMixed)) {
        MixInvert( mixSelect );
        mixSelect = 0;

if ((!KnotClick( &mixes[mix].knots, &MixDrawBits, mix, pt ) && PtInRect( pt, &mixes[mix].wave)) {

MixRect( mix, &bm.bounds );
            bm.rowBytes = ((bm.bounds.right - bm.bounds.left + 15) >> 4) << 1;
            off = NewHandle( bm.rowBytes * (long)(bm.bounds.bottom - bm.bounds.top) );

lastPt = pt;
            while (True) {
                GetMouse( &pt );
                deltaH = pt.h - lastPt.h;
```

```
            while ((mixes[mix].wave.right + deltaH) > (mixH + mixWidth)) deltaH--;
            while ((mixes[mix].wave.left + deltaH) < mixH) deltaH++;

if (deltaH) {
                OffsetRect( &mixes[mix].wave, deltaH, 0 );
                lastPt = pt;

SetPort( &offPort );
                HLock( off );
                bm.baseAddr = *off;
                SetPortBits( &bm );

MixDrawBits( mix );

SetPort( mixer );
                CopyBits( &bm, &mixer->portBits, &bm.bounds, &bm.bounds, srcCopy, NIL );
                HUnlock( off );

}
            if (!StillDown()) break;
        }
        DisposHandle( off );

} /* in rect */
}
else if (itemHit == 11) {
    WatchCursor();
    mixList.null = 0x8080;

for (i=0;i<4;i++) {
        mixList.delta[i] = 0;
        mixList.wave[i] = (Ptr)&mixList.null;
        mixList.delay[i] = 0x7FFFFFFF;  /* long delay for empty channels   */  /* <SMR 09/11/88> */
    }
    maxLen = 0;
    for (i=0;i<nMixed;i++) {
        w = mixes[i].wind;
        chanToPlay = mixes[i].chanFirst;                                        /* <SMR 09/09/88> */
        beg = mixes[i].beg;                                                     /* <SMR 09/11/88> */
        end = mixes[i].end;                                                     /* <SMR 09/11/88> */
        len = GetHandleSize( w->data[chanToPlay] );                             /* <SMR 09/11/88> */
        if(end > len) end = len;                                                /* <SMR 09/11/88> */ if (beg <= len) {
            delta = -1;
            if (w->info[rate] == 2) delta = 0x55555555;
            else if (w->info[rate] == 3) delta = 0x24924924;
            else if (w->info[rate] == 4) delta = 0x11111111;
            mixList.delta2B[i] = delta;

/* ok to point into the unlocked wave since no
               calls that may move memory are made between
               here and the sound finishing
            */
            mixList.wave2B[i] = *w->data[chanToPlay] + beg;                     /* <SMR 09/09/88> */ offset = (((long)(mixes[i].wave.left - mixH)) << (16+fudge)) / mixDelta;
            mixList.delay[i] = 1 + offset * 60 /* * w->info[rate] */ / maxFactor;  /* delay 1 60th */  /* <SC 05/31/88> */ len = (end - beg) * 60 * w->info[rate] / maxFactor;/* delay 1 60th */  /* <SMR 09/11/88> */
            mixList.ticks[i] = mixList.delay[i] + len;
            if (len > maxLen) maxLen = len;
        }
    }
    mixList.count = (maxLen == 0) ? 1 : maxLen; /* stop VBL from waiting forever  */  /* <SMR 09/11/88> */

Sound4Start( &mixList );

while (soundVBL.isSound)
        if (Button()) {
            mixList.count = 1;
            while (mixList.count > 0) ;
            soundVBL.wave = NIL;
            break;
        }
    KillSound();
    FlushEvents( everyEvent, 0 );

InitCursor();
}
else if (itemHit == 14) {
    i = (mixSelect == 10) ? mixOut : ((mixSelect-2) / 2);
    MixDisconnect( i );
    mixSelect = 0;
```

```
           }
     }

MixIdle()
    {
        short   ok;

EnableCtlItem( mixer, 1, nMixed > 0 );      /* enable buttons if something there */
        EnableCtlItem( mixer, 11, nMixed > 0 );

ok = mixSelect > 0;
        if (((mixSelect-2) & 2) == 2) ok = (mixes[mixOut].wind != NIL);
        EnableCtlItem( mixer, 14, ok );             /* something to disconnect */
    }

MixInval( w )
    register GWindPeek  w;
    {
        register short  mix;
        register long   max;
        GrafPtr         save;
        Rect            r;

GetPort( &save );
        SetPort( mixer );

/* look at ALL mixers, unassigned ones have nil window */

/* set up new values */
        for (mix=0;mix<nMixers+1;mix++) if (w == mixes[mix].wind) {
            if (mix < mixOut) {
                mixes[mix].sRate = w->info[rate];

if (mixes[mix].sMode != w->info[mode]) {
                    mixes[mix].chanFirst = w->chanFirst;
                    mixes[mix].chanLast  = w->chanLast;
                }
                mixes[mix].sMode = w->info[mode];
            }
        }

/* see if time to recalc */
        MixDeltoid();

for (mix=0;mix<nMixers+1;mix++) if (w == mixes[mix].wind) {
            if (mix < mixOut) {
                MixRect( mix, &r );
                r.left = 2;
                InvalRect( &r );

MixPlot( w, mix );
            }
            else {                      /* inval mix out too */
                GetItemRect( mixer, 10, &r );
                InsetRect( &r, 2, 2 );
                InvalRect( &r );
            }
            MixRenew( mix );
        }
        SetPort( save );
    }

MixInvert( item )
    short       item;
    {
        Rect    r;

if (item > 0) {
            GetItemRect( mixer, item, &r );
            InsetRect( &r, 3, 2 );
            HiliteMode &= 0x7F;             /* use hilite mode */
            InvertRect( &r );
        }
    }
```

```
MixItUp()
{
    register short   mix, j;
    Rect             r;

if (!mixer) {
        mixer = GetDialogX( 2010 );
        for (mix=0;mix<nMixers;mix++)
            for (j=2;j<=3;j++) SetUserProc( mixer, mix*2 + j, (Ptr)&MixDrawProc );
        SetUserProc( mixer, 10, (Ptr)&MixDrawProc );

SetNumItem( mixer, 13, mixMaster * 100L / 128 );
        SelIText( mixer, 13, 0, 1111 );

MixIdle();          /* force one event */
    }
    ShowWindow( mixer );
    SelectWindow( mixer );
    mixVisible = True;
}

/*
    Disassociate label from mixer and update mixer.  Renumber references to higher
    numbered labels from same window.
*/
void MixLabelKill( w, lab )
    register GWindPeek  w;
    register short      lab;
{
    register short      i;

for(i=0;i<nMixers+1;i++)
        if( mixes[i].wind == w )              /* must be same window              */
            if( mixes[i].label == lab ) {     /* label being deleted              */
                mixes[i].label = -1;          /* no label associated w/ channel   */
                MixRenew( i );                /* cause re-draw w/ range instead   */
            }
            else if( mixes[i].label > lab )   /* higher numbered label            */
                mixes[i].label--;             /* renumber it                      */
}

/*
    Disassociate all of a window's labels from the mixer.
*/
void MixLabelsKill( w )
    register GWindPeek  w;
{
    register short      i;

for(i=0;i<nMixers+1;i++)
        if( mixes[i].wind == w )              /* must be same window              */
            mixes[i].label = -1;
}

/*
    Call MixRenew for all mixer channels that reference the specified label.
*/
void MixLabelRenew( w, lab )
    register GWindPeek  w;
    register short      lab;
{
    register short      i;

for(i=0;i<nMixers+1;i++)
        if( mixes[i].wind == w )              /* must be same window              */
            if( mixes[i].label == lab )       /* label whose text changed         */
                MixRenew( i );                /* cause re-draw w/ new text        */
}

MixPlot( w, mix )
GWindPeek   w;
short       mix;
{
```

```
    register Ptr    out;
    Handle  h;
    Ptr     in;
    short   i, j;
    char    mask;
    short   right, rightByte;
    short   locked;
    Ptr     dest;
    short   height;

h = mixes[mix].bits;
    SetHandleSize( h, mixRowBytes * 70L );
    in = *h;                                            /* Erase it */
    for (i=0;i<70*mixRowBytes;i++) *in++ = 0;

locked = SafeLock( h );

right = ((mixes[mix].end - mixes[mix].beg) * mixDelta * mixes[mix].sRate) >> (16+fudge);
    mixes[mix].wave.right = mixes[mix].wave.left + right;

dest = *h+knotIndent*mixRowBytes;
    height = 2;
    if (mixes[mix].chanFirst != mixes[mix].chanLast) height = 3;

for (i=mixes[mix].chanFirst;i<=mixes[mix].chanLast;i++) {
        PlotPixels( w->data[i], mixes[mix].beg, w->info[compress], False, mixSkip,
                    0, right, (mixDelta*mixSkip*mixes[mix].sRate) >> fudge, height,
                    dest, mixRowBytes );

dest += 32*mixRowBytes;
    } mask = 0xAA;                            /* grey out the waveform */
    in = out = *h+knotIndent*mixRowBytes;
    for (i=0;i<64;i++) {
        if (i % 4)
            for (j=0;j<mixRowBytes;j++) *out++ = *in++ & mask;
        else
            in += mixRowBytes;              /* skip every fourth row */
        mask ^= 0xFF;
    }
    for (i=0; i<knotIndent*mixRowBytes;i++) *out++ = 0;     /* add white space*/ if (right > 0) right--;
    rightByte = right >> 3;                 /* add the stripes */
    right = 0x80 >> (right & 7);
    out = *h;
    for (i=0;i<mixRealHite;i++) {
        *out |= 0x80;                       /* add left line */
        *(out+rightByte) |= right;          /* add right line */
        out += mixRowBytes;
    } if (locked) HUnlock( h );
    SetHandleSize( h, mixRowBytes * (long)mixRealHite );

MixRenew( mix );
}

MixRenew( mix )
register short mix;
{
    Rect    r;
    GrafPtr save;
    short   left;
    if (mixer) {
        GetPort( &save );
        SetPort( mixer );

if (mixActive) MixInvert( mixSelect );      /* drop selection */
        mixSelect = 0;

if (mix == mixOut) {
            GetItemRect( mixer, 10, &r );
            InsetRect( &r, 1, 1 );
            InvalRect( &r );
        }
        else {
            GetItemRect( mixer, mix*2+2, &r );
            left = r.left;
            GetItemRect( mixer, mix*2+3, &r );
            r.left = left;
            InsetRect( &r, 1, 1 );
            InvalRect( &r );
        }
        SetPort( save );
    }
}
```

```
MixSetup( w, mix )
register GWindPeek  w;
register short      mix;
{
    Handle          h;
    register short  i;
    GWindPeek       destWind;

if (mix != mixOut) {
        if (!CheckMemory( mixRowBytes * 70L, 19 )) return;
        nMixed++;
    } mixes[mix].wind = w;
    mixes[mix].beg = w->reports[repSelBeg];
    mixes[mix].end = w->reports[repSelEnd];
    /*
    if (w->reports[repSelBeg] == w->reports[repSelEnd]) {
        mixes[mix].beg = 0;
        mixes[mix].end = w->reports[repLength];
    }
    */
    mixes[mix].sRate = w->info[rate];
    mixes[mix].sMode = w->info[mode];
    mixes[mix].chanFirst = w->chanFirst;
    mixes[mix].chanLast = w->chanLast;
    mixes[mix].label = w->activeLabel2B;
    if(w->activeLabel2B == -1)                                              /* <SMR 10/01/88> */
        mixes[mix].label = LabelFindLR( w, mixes[mix].beg, mixes[mix].end); /* <SMR 10/01/88> */
    else                                                                    /* <SMR 10/01/88> */
        mixes[mix].label = w->activeLabel2B;

if (mix < nMixers) {
        mixes[mix].bits = ZeroHandle( mixRowBytes * 65L );
        #if beta
        if (!mixes[mix].bits) Shit("\pNo bits in mix N°30");
        #endif MixRect( mix, &mixes[mix].wave );

if (!MixDeltoid()) MixPlot( w, mix );
    }

/* make sure incestuous mixes are OK (dest must be whole wave) */
    destWind = mixes[mixOut].wind;
    if (destWind) for (i=0;i<nMixed;i++) {
        if (mixes[i].wind == destWind) {
            if ((mixes[mixOut].beg > 0) || (mixes[mixOut].end < destWind->reports[repLength])) {
                if (mix != mixOut) {
                    DisposHandle( mixes[mix].bits );
                    mixes[mix].bits = NIL;
                    nMixed--;

}
                mixes[mix].wind = NIL;
                ErrorAlert( w->name, 59 );
                return;
            } if 0
            if ((mixes[i].beg < mixes[mixOut].beg) || (mixes[i].end > mixes[mixOut].end)) {
                if (mix != mixOut) {
                    DisposHandle( mixes[mix].bits );
                    mixes[mix].bits = NIL;
                    nMixed--;
                }
                mixes[mix].wind = NIL;
                ErrorAlert( w->name, 59 );
            }
            #endif
        }
    }

MixItUp();
}
```

MiscRtns.c

```
/*
    SoundTrack source (AudioMisc.c)
    ©1987 Farallon

Written by Steve Capps with a lot of help from:
        Mike Lamoureux, Sam Roberts & Joe Sensendorf

*/
short KnotClick( list, backgnd, msg, pt )
KnotList    *list;
ProcPtr     backgnd;
```

```
short          msg;
Point          pt;
{
    Point      *p, knot1Pt, knot2Pt, ptNorm, phase;
    short      redraw;
    Rect       outer, bounds;
    BitMap     bm;
    Handle     off;
    GrafPtr    save;
    short      knot;
    short      inside;
    short      i, locked;

phase.h = 0; phase.v = 0;

knot = KnotFind( list, pt );
    if (knot >= 0 ) {
        inside = True;

/* calculate difference between box origin and pt */ phase = *(*list->pts + knot);
        AddPt( topLeft(list->bounds), &phase );
        SubPt( pt, &phase );
    }
    else {
        ptNorm = pt;
        SubPt( topLeft(list->bounds), &ptNorm );

knot1Pt = *(*list->pts);

knot = -1;
        for (i=1;i<list->nKnots;i++) {
            knot2Pt = *(*list->pts + i);

if (HitLine( knot1Pt, knot2Pt, ptNorm )) {
                knot = i-1;
                inside = False;
                break;
            }
            knot1Pt = knot2Pt;
        }
        if (knot < 0) return(False);
    }

GetPort( &save );

bm.bounds = outer = list->bounds;        /* start with given rect */
    InsetRect( &bm.bounds, 0, -2 );          /* room for knots */
    InsetRect( &outer, -1000, -8 );          /* Outset for "PullOut" deleting */     /* <SC 07/20/88> */ if 0
    /* prevent horizontal pullout for endpoints (hack) */                             /* <SC 07/20/88> */
    if( (knot == 0) || (knot == (list->nKnots-1)) )                                   /* <SC 07/20/88> */
        InsetRect( &outer, -1000, 0 );                                                /* <SC 07/20/88> */
endif bm.rowBytes = ((bm.bounds.right - bm.bounds.left + 15) >> 4) << 1;
    off = NewHandle( bm.rowBytes * (long)(bm.bounds.bottom - bm.bounds.top) );

while (StillDown()) {
        GetMouse( &pt );
        AddPt( phase, &pt );

redraw = False;
        if (PtInRect( pt, &outer )) { if (!inside) {
                p = *list->pts;
                *((long *)&pt) = PinRectX( &list->bounds, pt );
                ptNorm = pt;
                SubPt( topLeft(list->bounds), &ptNorm );
                for (knot=0;knot<list->nKnots-1;knot++) if (p++->h > ptNorm.h ) break;
                SafeReplace( (Handle)list->pts, knot*4, 0, (Ptr)&ptNorm, 4 );
                list->nKnots++;
                inside = True;
            } p = *list->pts + knot;              /* Pin knots with neighbors */
            if (knot > 0) {
                bounds.left = (p-1)->h + 2;
                if (knot < list->nKnots-1)
                    bounds.right = (p+1)->h - 2;
                else
                    bounds.left = bounds.right = list->bounds.right - list->bounds.left;
```

```
        }
        else {
            bounds.left = bounds.right = 0;
        }
        OffsetRect( &bounds, list->bounds.left, list->bounds.left );

*((long *)&pt) = PinRectX( &list->bounds, pt );  /* pin the drag pt */
        if (pt.h < bounds.left) pt.h = bounds.left;
        if (pt.h > bounds.right) pt.h = bounds.right;

ptNorm = pt;
        SubPt( topLeft(list->bounds), &ptNorm );
        redraw = !EqualPt( *p, ptNorm );             /* redraw if changed */

*p = ptNorm;                                  /* record new pt */

}
    else {
        if ((inside) && (knot > 0) && (knot < list->nKnots-1)) {
            SafeReplace( (Handle)list->pts, knot*4, 4, (Ptr)1, 0);
            list->nKnots--;

inside = False;
            redraw = True;
        }
    } /* in outer rect */ if (redraw) {
        SetPort( &offPort );
        locked = SafeLock( off );
        bm.baseAddr = *off;
        SetPortBits( &bm );

(*backgnd)( msg );

SetPort( save );
        CopyBits( &bm, &save->portBits, &bm.bounds, &bm.bounds, srcCopy, NIL );
        if (locked) HUnlock( off );
    }
    }
    DisposHandle( off );
    return(True);
}

KnotDraw( list )
register KnotList  *list;
{
    register short  i, x;
    Point           pt;
    Rect            r;

for (i=0;i<list->nKnots;i++) {
        pt = *(*list->pts + i);
        AddPt( topLeft(list->bounds), &pt );

PenSize( 2, 2 );
        if (i)
            LineTo( pt.h, pt.v );
        else
            MoveTo( pt.h, pt.v );

x = list->bounds.left + 2;          /* pin h it inside box */
        if (pt.h < x) pt.h = x;
        x = list->bounds.right - 3;
        if (pt.h > x) pt.h = x;

#if 0
        x = list->bounds.top + 2;           /* pin v it inside box */
        if (pt.v < x) pt.v = x;
        x = list->bounds.bottom - 2;
        if (pt.v > x) pt.v = x;
        #endif SetRect( &r, -2, -2, 4, 4 );
        OffsetRect( &r, pt.h, pt.v );
        FillRect( &r, &black );
    }
} short KnotFind( list, findPt )
register KnotList  *list;
Point              findPt;
{
    short   i;
    Point   pt;
    Rect    r;
```

```
    for (i=0;i<list->nKnots;i++) {
        pt = *(*list->pts + i);
        AddPt( topLeft(list->bounds), &pt );

SetRect( &r, -6, -6, 8, 8 );
        OffsetRect( &r, pt.h, pt.v );
        if (PtInRect( findPt, &r )) return(i);
    }
    return(-1);
}

KnotInit( list, r )
register KnotList    *list;
Rect                 *r;
{
    list->bounds = *r;
    list->pts = (Point **)NewHandle( 0 );
    KnotReset( list );
}

KnotKill( list )
register KnotList    *list;
{
    DisposHandle( list->pts );
}

KnotOffset( list, dh, dv )
register KnotList    *list;
short                dh, dv;
{
    OffsetRect( &list->bounds, dh, dv );
}

KnotReset( list )
register KnotList    *list;
{
    Rect    r;

list->nKnots = 2;
    SetRect( &r, 0, 0, list->bounds.right - list->bounds.left, 0 );
    PtrToXHand( &r, list->pts, 8 );
}

MixRect( mix, r )         /* <JS 5/18/88> */
short    mix;
Rect     *r;
{
    SetRect( r, 0, 0, mixWidth, mixRealHite );
    OffsetRect( r, mixH, mixV + mix*mixSpacing );
}

PlotPixels( samples, offset, comp, lines, skip, leftH, rightH, delta, scaleV, dest, destWidth )
Handle   samples;
long     offset;
short    comp;
short    lines;
short    skip;
short    leftH;
short    rightH;
Fixed    delta;
short    scaleV;
Ptr      dest;
short    destWidth;
{
    short    toggle;

#define    Pmin    3*CVSDmin         /* like Kmin in CVSD */
    #define    Pshift  CVSDdecay         /* like a */
    #define    PPshift CVSDgain          /* like aa */ if (comp == 2)          /* <JS 5/6/88> replaced entire code for compressed case */
        PlotCompPixels(samples, offset, skip, leftH, rightH, delta, scaleV, dest, destWidth);
    else if (comp == 1)
        PlotCVSD(samples, offset, skip, leftH, rightH, delta, scaleV, dest, destWidth);
    else asm {
        MOVEM.L    A2-A4/D2-D7,-(SP)    ; save regs MOVE       scaleV(A6),D2        ; get v Scale
        MOVE.L     samples(A6),A2       ; get data handle
        MOVE.L     delta(A6),D6
        MOVE.L     offset(A6),D7
```

```
                MOVE        leftH(A6),D5        ; do starting H pixel
                SWAP        D5
                CLR         D5                  ; clear low order MOVE        rightH(A6),D4       ; pin right H at right edge
                SWAP        D4                  ; put in high order
                CLR         D4                  ; clear low order MOVE.L      A2,A0               ; get byte limit
                _GetHandleSize
                MOVE.L      D0,A1               ; save length CMP.L       D7,D0               ; offset past length ?
                BLT         @plotExit MOVE.L      (A2),A2             ; dereference
                ADD.L       A2,A1               ; calculate length
                ADD.L       D7,A2               ; add offset TST         lines(A6)           ; lines or dots
                BNE         @doLines @plotLoop2                                      ; dot plots
                CMP.L       A2,A1               ; too far?
                BLS         @plotExit MOVEQ       #0,D1
                MOVE.B      (A2),D1             ; get the value
                ADD         skip(A6),A2

NOT.B       D1                  ; flip direction
                LSR         D2,D1               ; scale it MULU        destWidth(A6),D1    ; dest.rowBytes
                MOVE.L      dest(A6),A0         ; dest Address
                ADD.L       D1,A0

MOVE.L      D5,D0               ; get byte plus pixel
                SWAP        D0                  ; get integer
                MOVE        D0,D1               ; save for bit calc LSR         #3,D0               ; over to right byte
                ADD         D0,A0

NOT.B       D1
                BSET        D1,(A0)             ; plot that bit

ADD.L       D6,D5               ; bump h position

CMP.L       D5,D4               ; too far
                BGE.S       @plotLoop2
                BRA         @plotExit
@doLines
                MOVEQ       #0,D3
                MOVE.B      (A2),D3
                TST.L       D7                  ; from beginning?
                BEQ.S       @goPlot MOVE.L      A2,A0               ; get previous guy
                SUB         skip(A6),A0
                MOVEQ       #0,D3               ; set revious to same
                MOVE.B      (A0),D3
@goPlot
                NOT.B       D3                  ; flip it
                LSR         D2,D3               ; scale it
@plotLoop3
                CMP.L       A2,A1               ; too far?
                BLS.S       @plotExit MOVEQ       #0,D1
                MOVE.B      (A2),D1             ; get the value
                ADD         skip(A6),A2

NOT.B       D1                  ; flip direction
                LSR         D2,D1               ; scale it
                MOVE        D1,D7               ; save value MULU        destWidth(A6),D1    ; dest.rowBytes MOVE.L      dest(A6),A0         ; dest Address
                ADD.L       D1,A0

MOVE.L      D5,D0               ; get byte plus pixel
                SWAP        D0                  ; get integer
                MOVE        D0,D1               ; save for bit calc LSR         #3,D0               ; over to right byte
                ADD         D0,A0
```

```
        NOT.B      D1
        BSET       D1,(A0)              ; plot that bit SUB        D7,D3                ; get delta
        BPL.S      @up
@down
        ADDQ       #1,D3
        BGE.S      @done
        SUB        destWidth(A6),A0
        BSET       D1,(A0)              ; plot that bit
        BRA.S      @down
@up
        SUBQ       #1,D3
        BLE.S      @done
        ADD        destWidth(A6),A0
        BSET       D1,(A0)              ; plot that bit
        BRA.S      @up
@done
        MOVE       D7,D3

ADD.L      D6,D5                ; bump h position
        CMP.L      D5,D4                ; too far
        BGE.S      @plotLoop3
@plotExit
        MOVEM.L    (SP)+,A2-A4/D2-D7    ; restore regs
    }
}
```

---

Envelope.c

```
/*
    Envelope sound effect

Modification History:
    --------------------

<JS 12/14/87>   Exit right away if no selection (also fixes divide by zero).
    <SC 07/20/88>   Inset knot deletion rect by (-1000, -4) instead of (-4, -4)
                    so that knots are deleted only by dragging vertically off
                    wave, not by dragging horizontally off wave. This also
                    allows end knots to track with mouse off to left or right
                    of wave.

*/
include "AudioDefs"
    _GetA4( void );
#include "SetUpA4.h"

define waveItem 3 typedef struct {
    Handle      off;            /* offscreen bitmap */
    Point       **knots;        /* Handle of points */
    short       nKnots;         /* Number of knots */
    short       range;          /* multiplier */
} Envelope, *EnvelopePtr, **EnvelopeHandle;

pascal short   main( GWindPeek, short, long, long, EventRecord *, Effect * );

ApplyEnvelope( GWindPeek, short, EnvelopePtr, long, long );
Handle         BuildEnvelope( DialogPtr, GWindPeek );
               DragKnot( DialogPtr, EnvelopePtr, short, short );
               DragKnotInd( short, short );
pascal void    DrawEnvelope( DialogPtr, short );
               DrawKnots( EnvelopePtr );

pascal short main( w, opcode, op1, op2, evt, efx )
    register GWindPeek   w;
    short                opcode;
    long                 op1, op2;
    EventRecord          *evt;
    Effect               *efx;
{
    short                x;
    register DialogPtr   dlg;
    short                item, kind, result;
    Handle               h;
    Rect                 r, frame, drag;
    Point                pt, knot, knot2;
    short                i;
    register EnvelopePtr env;
    short                rangeItem;
    char                 str[256];
    long                 l;
```

```
RememberA0();
SetUpA4();

if (op2 <= op1) {
    RestoreA4();
    return (FALSE);
} result = False;

switch (opcode) {
    case opDoIt:                                    /* op1, op2 are left & right of selection */
        dlg = GetDialog( efx->id*10 );
        SetWRefCon( dlg, (long)efx );               /* salt owner away */
        SetPort( dlg );

GetDItem( dlg, waveItem, &kind, &h, &frame );
        SetDItem( dlg, waveItem, kind, &DrawEnvelope, &frame );
        drag = frame;
        InsetRect( &drag, 4, 4 );

if (!efx->h) {
            efx->h = NewHandle( sizeof(Envelope) );
            r = drag;
            /*r.top += 8;                           /* build a flat curve */
            r.bottom = r.top;

PtrToHand( &r, &h, 8 );

env = (EnvelopePtr)*efx->h;
            env->nKnots = 2;
            env->knots = (Point **)h;
            env->range = 1;
        }
        HLock( efx->h );

env = (EnvelopePtr)*efx->h;
        env->off = BuildEnvelope( dlg, w );

switch (env->range) {
            case 1:
                rangeItem = 4;
                break;

case 2:
                rangeItem = 5;
                break;

default:
                rangeItem = 6;
                SetNumItem( dlg, 9, env->range );
                SelIText( dlg, 9, 0, 1111 );
                break;
        }
        ToggleCtlItem( dlg, rangeItem );            /* set up range stuff */ while (True) {
            ModalDialog( NIL, &item );              /* Ask the user for parameters */ if (item <= 2) break;
            else if (item == waveItem) {
                GetMouse( &pt );

for (i=0;i<env->nKnots;i++) {
                    knot = *(*env->knots + i);
                    SetRect( &r, -3, -3, 4, 4 );
                    OffsetRect( &r, knot.h, knot.v );
                    if (PtInRect( pt, &r )) {
                        DragKnot( dlg, env, i, True );
                        break;
                    }
                }
                knot = *(*env->knots);
                for (i=1;i<env->nKnots;i++) {
                    knot2 = *(*env->knots + i);
                    if (HitLine( knot, knot2, pt )) {
                        DragKnot( dlg, env, i-1, False );
                        break;
                    }
                    knot = knot2;
                }
            }
            else if (item == 8) {
                DragKnot( dlg, env, i, False );
            }
            else {
                if (item == 9) item = 6;            /* override text to control */
```

```
                        ToggleCtlItem( dlg, rangeItem );
                        rangeItem = item;
                        ToggleCtlItem( dlg, rangeItem );
                        switch (rangeItem) {
                            case 4: {
                                env->range = 1;
                                break;
                            }
                            case 5: {
                                env->range = 2;
                                break;
                            }
                            case 6: {
                                GetTextItem( dlg, 9, str );
                                StringToNum( str, &l );
                                env->range = l;
                                /*env->range = GetNumItem( dlg, 9, 1, 99 );*/
                                break;
                            }
                        }
                        /* redraw scale */
                        GetDItem( dlg, 11, &kind, &h, &r );
                        r.bottom = r.top + 16;
                        InsetRect( &r, 1, 1 );
                        InvalRect( & r );
                    }
                }
                if ((item == 1) && (rangeItem == 6)) {
                    env->range = GetNumItem( dlg, 9, 1, 99 );
                }
                DisposDialog( dlg );
                UpdateWindows();
                DisposHandle( env->off );

if (item == 1) {
                    if (result = UndoPrep( w, 6, op1, op2, False )) {
                        UndoModify( op1, op2-op1 );

WatchCursor();
                        ApplyEnvelope( w, drag.right - drag.left, env, op1, op2 );
                    }
                }
            }
        }

HUnlock( efx->h );

RestoreA4();
        return(result);
    }

ApplyEnvelope( w, width, env, start, end )
register GWindPeek      w;
short                   width;
EnvelopePtr             env;
long                    start, end;
{
    short               i, horz, x, test;
    Point               pt1, pt2, *pKnot;
    Rect                r;
    register unsigned char *lp;
    long                cnt, cntDelta, delta;
    long                amp, deltaAmp;
    short               useAmp;
    long                len, useEnd;

for (i=w->chanFirst;i<=w->chanLast;i++) {        /* do it for both tracks if there */
        len = GetHandleSize(w->data[i]);             /* JS: check for selection past end */
        if (start >= len) continue;
        useEnd = end;
        if (useEnd > len) useEnd = len;
        cnt = useEnd - start;
        delta = (((long)width) << 16) / cnt;

pKnot = *env->knots;
        pt1 = *pKnot++;
        pt2 = *pKnot++;
        while (pt2.h == pt1.h) pt2 = *pKnot++;

amp = ((long)(64 + 10 - pt1.v)) << 16 ;
        deltaAmp = (((long)(pt1.v - pt2.v)) << 16) / (pt2.h - pt1.h);
        test = env->nKnots - 2;

cntDelta = 0;
```

```
        horz = pt1.h;

lp = (unsigned char *)*w->data[i] + start;
        while (True) {
            useAmp = (amp >> 16) * env->range;

cntDelta &= 0x0000FFFF;
            while ((cntDelta < 0x00010000) && (cnt-- > 0)) {
                x = (((short)(*lp - 128) * useAmp) >> 6) + 128;
                if (x<0) x = 0;
                if (x>255) x = 255;
                *lp++ = x;

cntDelta += delta;
            } if (cnt <= 0) break;

amp += deltaAmp;
            if (horz++ > pt2.h) {
                pt1 = pt2;
                pt2 = *pKnot++;
                while (pt2.h == pt1.h) pt2 = *pKnot++;

amp = ((long)(64 + 10 - pt1.v)) << 16;
                deltaAmp = (((long)(pt1.v - pt2.v)) << 16) / (pt2.h - pt1.h);
            }
        }
    } /* for each byte */
  } /* for each channel */
}

Handle BuildEnvelope( dlg, w )
DialogPtr       dlg;
register GWindPeek  w;
{
    short       rowBytes;
    short       kind;
    Rect        frame;
    Handle      h;
    Handle      off;
    long        left, cnt, delta;
    char        *p, mask;
    short       i,j;
    long        skip;

GetDItem( dlg, waveItem, &kind, &h, &frame );
    InsetRect( &frame, 4, 4 );

left = w->reports[repSelBeg];
    cnt = w->reports[repSelEnd] - left;
    if (!cnt) {
        left = 0;
        cnt = w->reports[repLength];
    } delta = (((long)(frame.right - frame.left)) << 16) / cnt;
    skip = 1;
    while (True) {
        if (delta*skip > 0x00000400) break;
        skip <<= 1;
    } rowBytes = ((frame.right - frame.left + 16) >> 4) << 1;
    off = ZeroHandle( rowBytes * (long)(frame.bottom - frame.top + 3) );
    HLock( off );

PlotPixels( w->data[w->chanFirst], left, w->info[compress], False, skip,
                0, frame.right - frame.left, delta*skip, 1, *off+2*rowBytes, rowBytes );

if (w->chanFirst != w->chanLast)
        PlotPixels( w->data[w->chanLast], left, w->info[compress], False, skip,
                    0, frame.right - frame.left, delta*skip, 1, *off+2*rowBytes, rowBytes );

mask = 0xAA;                        /* grey out the waveform */
    p = *off;
    for (i=frame.top; i<frame.bottom;i++) {
        for (j=0;j<rowBytes;j++) *p++ &= mask;
        mask ^= 0xFF;
    }

HUnlock( off );
    return( off );
}

DragKnot( dlg, env, knot, inside )
DialogPtr           dlg;
```

```
register EnvelopePtr    env;
short                   knot;
short                   inside;
{
    Point   pt, *p;
    short   kind;
    Handle  item;
    Rect    drag, outer, bounds;
    short   draggeur;

GetDItem( dlg, waveItem, &kind, &item, &outer );
    drag = outer;
    InsetRect( &outer, -1000, -4 );         /* rect for deleting  */  /* <SC 07/20/88> */
    InsetRect( &drag, 4, 4 );               /* rect for pinning   */
    drag.bottom = drag.top + 65;            /* only top half      */
    bounds = drag;
    InsetRect( &bounds, 0, -3 );            /* rect for clipping  */ draggeur = 0;                           /* no indicator       */ while (StillDown()) {
        GetMouse( &pt );

if (PtInRect( pt, &outer )) {
            if (!inside) {
                p = *env->knots;
                *((long *)&pt) = PinRect( &drag, pt );
                for (knot=0;knot<env->nKnots-1;knot++) if (p++->h > pt.h ) break;
                Munger( env->knots, knot*4, (Ptr)1, 0, &pt, 4 );
                env->nKnots++;
            }
            inside = True;

p = *env->knots + knot;
            if (knot > 0) {
                bounds.left = (p-1)->h + 2;
                if (knot < env->nKnots-1)
                    bounds.right = (p+1)->h - 2;
                else
                    bounds.left = bounds.right = drag.right;
            }
            else {
                bounds.left = bounds.right = drag.left;
            }

*((long *)&pt) = PinRect( &drag, pt );
            if (pt.h < bounds.left) pt.h = bounds.left;
            if (pt.h > bounds.right) pt.h = bounds.right;

if (!EqualPt( *p, pt)) {
                if (knot == 0) {            /* setup clip */
                    bounds.left = drag.left;
                    bounds.right = (p+1)->h;
                }
                if (knot == env->nKnots-1) {
                    bounds.left = (p-1)->h;
                    bounds.right = drag.right;
                }
                InsetRect( &bounds, -3, 0 );

if (draggeur) DragKnotInd( drag.left, draggeur );/* draw indicator */
                draggeur = pt.v;
                DragKnotInd( drag.left, draggeur );

*p = pt;
                ClipRect( &bounds );             /* draw wave */
                DrawEnvelope( dlg, waveItem );
                ClipRect( &dlg->portRect );
            }
        }
        else {
            if (draggeur) DragKnotInd( drag.left, draggeur );
            draggeur = 0;

if ((inside) && (knot > 0) && (knot < env->nKnots-1)) {
                Munger( env->knots, knot*4, NIL, 4, (Ptr)1, 0);
                env->nKnots--;
                DrawEnvelope( dlg, waveItem );
                inside = False;
            }
        }
    }
    if (draggeur) DragKnotInd( drag.left, draggeur );
}

DragKnotInd( h, v )
short   h, v;
{
```

```
    PenNormal();                /* draw indicator */
    PenMode( patXor );
    MoveTo( h - 27, v );
    Line( 6, 0 );
    PenNormal();
}

DrawKnots( env )
register EnvelopePtr    env;
{
    short   i;
    Point   pt;
    Rect    r;

for (i=0;i<env->nKnots;i++) {
        pt = *(*env->knots + i);
        PenSize( 2, 2 );
        if (i)
            LineTo( pt.h, pt.v );
        else
            MoveTo( pt.h, pt.v );

PenSize( 3, 3 );
        SetRect( &r, -2, -2, 4, 4 );
        OffsetRect( &r, pt.h, pt.v );
        FrameRect( &r );
    }
} pascal void DrawEnvelope( dlg, item )
DialogPtr   dlg;
short       item;
{
    short       kind;
    Handle      h;
    Rect        r;
    BitMap      bm;
    Effect      *efx;
    EnvelopePtr env;
    register short  half;
    char        str[32];

efx = (Effect *)GetWRefCon( dlg );
    env = (EnvelopePtr)*efx->h;

PenNormal();
    GetDItem( dlg, item, &kind, &h, &r );
    bm.bounds = r;
    InsetRect( &bm.bounds, 4, 4 );
    FrameRect( &r );
    InsetRect( &r, 1, 1 );
    PenMode( srcBic );
    PenSize( 3, 3 );
    FrameRect( &r );
    PenNormal();

HLock( env->off );
    bm.rowBytes = ((bm.bounds.right - bm.bounds.left + 15) >> 4) << 1;
    bm.baseAddr = *env->off;
    CopyBits( &bm, &dlg->portBits, &bm.bounds, &bm.bounds, srcCopy, NIL );
    HUnlock( env->off );

DrawKnots( env );

PenNormal();
    TextFont( 1 );
    TextSize( 9 );
    GetDItem( dlg, 11, &kind, &h, &r );
    FrameRect( &r );
    InsetRect( &r, 1, 1 );
    EraseRect( &r );
    InsetRect( &r, -1, 3 );

half = (r.bottom+r.top) / 2;

MoveTo( r.right-6, r.top );
    Line( 5, 0 );
    MoveTo( r.right-4, r.top + (r.bottom-r.top) / 8 );
    Line( 3, 0 );
    MoveTo( r.right-6, r.top + (r.bottom-r.top) / 4 );
    Line( 5, 0 );
    MoveTo( r.right-4, half - (r.bottom-r.top) / 8 );
    Line( 3, 0 );
    MoveTo( r.right-6, half );
    Line( 5, 0 );

NumToString( env->range, &str[0] );
```

```
    MoveTo( r.right-7, r.top + 5 );
    Move( -StringWidth( &str[0] ), 0 );
    DrawString( &str[0]);

MoveTo( r.right-7, half + 4 );
    Move( -CharWidth( '0' ), 0 );
    DrawChar( '0' );

TextFont( 0 );
    TextSize( 0 );
}
```

---

Bender.c

---

```
/*
    Bender sound effect

Modification History:
    ---------------------

<JS 12/14/87>   exit right away if no selection (also fixes divide by zero).
    <SC 07/20/88>   Inset knot deletion rect by (-1000, -4) instead of (-4, -4)
                    so that knots are deleted only by draging vertically off
                    wave, not by dragging horizontally off wave. This also
                    allows end knots to track with mouse off to left or right
                    of wave.
*/ include "AudioDefs"
__GetA4( void );                                                /* <SMR 07/19/88>  */
include "SetUpA4.h"                                            /* <SMR 07/19/88>  */ define waveItem 3 typedef struct {
    Handle      off;            /* offscreen bitmap */
    Point       **knots;        /* Handle of points */
    short       nKnots;         /* Number of knots */
    short       range;          /* multiplier */
} Envelope, *EnvelopePtr, **EnvelopeHandle;

pascal short    main( GWindPeek, short, long, long, EventRecord *, Effect * );

long            ApplyEnvelope( GWindPeek, short, EnvelopePtr, long, long, short, Handle );
Handle          BuildEnvelope( DialogPtr, GWindPeek );
                DragKnot( DialogPtr, EnvelopePtr, short, short );
                DragKnotInd( short, short );
pascal void     DrawEnvelope( DialogPtr, short );
                DrawKnots( EnvelopePtr );

pascal short main( w, opcode, op1, op2, evt, efx )
register GWindPeek  w;
short               opcode;
long                op1, op2;
EventRecord         *evt;
Effect              *efx;
{
    short               x;
    register DialogPtr  dlg;
    short               item, kind, result;
    Handle              h;
    Rect                r, frame, drag;
    Point               pt, knot, knot2;
    short               i;
    register EnvelopePtr env;
    Handle              buffer;
    long                len;

RememberA0();
    SetUpA4();

if ( op2 <= op1) {
        RestoreA4();                                            /* <SMR 07/19/88>  */
        return (FALSE);     /* JS */
    } result = False;

switch (opcode) {
        case opDoIt: {                                          /* op1, op2 are left & right of selection */
            dlg = GetDialog( efx->id*10 );
            SetWRefCon( dlg, (long)efx );                       /* salt owner away */
            SetPort( dlg );
```

```
GetDItem( dlg, waveItem, &kind, &h, &frame );
SetDItem( dlg, waveItem, kind, &DrawEnvelope, &frame );
drag = frame;
InsetRect( &drag, 4, 4 );

if (!efx->h) {
    efx->h = NewHandle( sizeof(Envelope) );
    r = drag;
    r.top = (r.top+r.bottom) >> 1;      /* build a flat curve */
    r.bottom = r.top;

PtrToHand( &r, &h, 8 );

env = (EnvelopePtr)*efx->h;
    env->nKnots = 2;
    env->knots = (Point **)h;
    env->range = 1;                     /* one octave */
}
HLock( &fx->h );

env = (EnvelopePtr)*efx->h;
env->off = BuildEnvelope( dlg, w );

ToggleCtlItem( dlg, env->range+3 );    /* set up range stuff */ while (True) {
    ModalDialog( NIL, &item );         /* Ask the user for parameters */ if (item <= 2) break;
    else if (item == waveItem) {
        GetMouse( &pt );

for (i=0;i<env->nKnots;i++) {
            knot = *(*env->knots + i);
            SetRect( &r, -3, -3, 4, 4 );
            OffsetRect( &r, knot.h, knot.v );
            if (PtInRect( pt, &r )) {
                DragKnot( dlg, env, i, True );
                break;
            }
        }
        knot = *(*env->knots);
        for (i=1;i<env->nKnots;i++) {
            knot2 = *(*env->knots + i);
            if (HitLine( knot, knot2, pt )) {
                DragKnot( dlg, env, i-1, False );
                break;
            }
            knot = knot2;
        }
    }
    else if (item == 6) {
        DragKnot( dlg, env, i, False );
    }
    else {
        ToggleCtlItem( dlg, env->range+3 );
        ToggleCtlItem( dlg, item );
        env->range = item-3;

/* redraw scale */
        GetDItem( dlg, 7, &kind, &h, &r );
        r.bottom = r.top + 12;
        InsetRect( &r, 1, 1 );
        InvalRect( & r );
        GetDItem( dlg, 7, &kind, &h, &r );
        r.top = r.bottom - 12;
        InsetRect( &r, 1, 1 );
        InvalRect( & r );
    }
}
DisposDialog( dlg );
UpdateWindows();
DisposHandle( env->off );

if (item == 1) {
    WatchCursor();
    len = ApplyEnvelope( w, drag.right - drag.left, env, op1, op2, False, NIL );

if (CheckMemory( len, 17 )) {
        buffer = NewHandle( len );     /* allocated specified amt of temp buffer */
        if (result = UndoPrep( w, 6, op1, op2, False )) {
            WatchCursor();
            ApplyEnvelope( w, drag.right - drag.left, env, op1, op2, True, buffer );
        }
        DisposHandle( buffer );
    }
}
```

```
    HUnlock( efx->h );

RestoreA4();                                                          /* <SMR 07/19/88> */
    return(result);
} long ApplyEnvelope( w, width, env, start, end, forReal, tempBuf )
GWindPeek    w;
short        width;
EnvelopePtr  env;
long         start, end;
short        forReal;
Handle       tempBuf;
{
    short           i, horz, x;
    Point           pt1, pt2, *pKnot;
    register unsigned char *lp;
    unsigned char   *beginP, *endP, *newP;
    long            cntDelta, useDelta, delta;
    Fixed           inc, deltaInc, useInc;
    Fixed           offset;
    long            insert;
    long            master;
    long            len, useEnd;

master = 0;
    for (i=w->chanFirst;i<=w->chanLast;i++) {           /* do it for both tracks if there */ len = GetHandleSize(w->data[i]);                /* JS: check for selection past end */
        if (start >= len) continue;

useEnd = end;
        if (useEnd > len) useEnd = len;
        delta = (((long)width) << 16) / (useEnd - start);

pKnot = *env->knots;
        pt1 = *pKnot++;
        pt2 = *pKnot++;
        while (pt2.h == pt1.h) pt2 = *pKnot++;

inc = (((long)(64 + 10) - pt1.v)) << 16;
        deltaInc = (((long)(pt1.v - pt2.v)) << 16) / (pt2.h - pt1.h);

cntDelta = 0;
        horz = pt1.h;

offset = 0;

beginP = (unsigned char *)*w->data[i] + start;
        endP = (unsigned char *)*w->data[i] + useEnd;

lp = beginP;
        newP = 0;
        insert = 0;
        if (forReal) newP = (unsigned char *)*tempBuf;

while (True) {
            useInc = GetLog( (env->range * inc) >> 16 );
            useDelta = FixMul( delta, useInc );

cntDelta &= 0x0000FFFF;
            while ((cntDelta < 0x00010000) && (lp < endP)) {
                asm {
                    MOVE.L   offset(A6),D0
                    ADD.L    useInc(A6),D0
                    SWAP     D0
                    ADD      D0,lp
                    CLR      D0
                    SWAP     D0
                    MOVE.L   D0,offset(A6)

TST      forReal(A6)
                    BEQ.S    @1

ASR.L    #1,D0

MOVEQ    #0,D1
                    MOVE.B   1(lp),D1
                    MULU     D0,D1           ; times fraction MOVEQ    #0,D2
                    MOVE.B   (lp),D2         ; get this half's value SUB.L    #0x00008000,D0
                    NEG.L    D0
                    MULU     D0,D2           ; times 10000-fraction
                    ADD.L    D1,D2
```

```
                    LSL.L   #1,D2
                    SWAP    D2          ; percentage of left sample MOVE.L  newP,A1     ; get dest
                    MOVE.B  D2,(A1)
                @1
                    ADDQ.L  #1,newP(A6) ; one new byte
                    ADDQ.L  #1,insert(A6) ; count one new byte

} cntDelta += useDelta;
            } if (lp >= endP) {
                if (insert > master) master = insert;
                if (forReal) {
                    HLock( tempBuf );
                    SafeReplace( w->data[i], start, useEnd-start, *tempBuf, insert );
                    HUnlock( tempBuf );
                }
                break;
            } inc += deltaInc;
            if (horz++ > pt2.h) {
                pt1 = pt2;
                pt2 = *pKnot++;
                while (pt2.h == pt1.h) pt2 = *pKnot++;

inc = (((long)(64 + 10) - pt1.v)) << 16;
                deltaInc = (((long)(pt1.v - pt2.v)) << 16) / (pt2.h - pt1.h);
            }
        } /* for each byte */

} /* for each channel */ if (forReal) {
        UndoInsert( start, master );
        SetSelection( w, start, start + master, w->chanFirst, w->chanLast );
    } return(master);        /* return buffer needed */
}

Handle BuildEnvelope( dlg, w )
DialogPtr       dlg;
register GWindPeek w;
{
    short       rowBytes;
    short       kind;
    Rect        frame;
    Handle      h;
    Handle      off;
    long        left, cnt, delta;
    char        *p, mask;
    short       i,j;
    long        skip;

GetDItem( dlg, waveItem, &kind, &h, &frame );
    InsetRect( &frame, 4, 4 );

left = w->reports[repSelBeg];
    cnt = w->reports[repSelEnd] - left;
    if (!cnt) {
        left = 0;
        cnt = w->reports[repLength];
    } skip = 1;
    delta = (((long)(frame.right - frame.left)) << 16) / cnt;
    while (True) {
        if (delta*skip > 0x00000400) break;
        skip <<= 1;
    } rowBytes = ((frame.right - frame.left + 16) >> 4) << 1;
    off = ZeroHandle( rowBytes * (long)(frame.bottom - frame.top + 3) );
    HLock( off );

PlotPixels( w->data[w->chanFirst], left, w->info[compress], False, skip,
                0, frame.right - frame.left, delta*skip, 1, *off+2*rowBytes, rowBytes );

if (w->chanFirst != w->chanLast)
        PlotPixels( w->data[w->chanLast], left, w->info[compress], False, skip,
                    0, frame.right - frame.left, delta*skip, 1, *off+2*rowBytes, rowBytes );
```

```
    mask = 0xAA;                            /* grey out the waveform */
    p = *off;
    for (i=frame.top; i<frame.bottom;i++) {
        for (j=0;j<rowBytes;j++) *p++ &= mask;
        mask ^= 0xFF;
    }

HUnlock( off );
    return( off );
}

DragKnot( dlg, env, knot, inside )
DialogPtr            dlg;
register EnvelopePtr env;
short                knot;
short                inside;
{
    Point   pt, *p;
    short   kind;
    Handle  item;
    Rect    drag, outer, bounds;
    short   draggeur;

GetDItem( dlg, waveItem, &kind, &item, &outer );
    drag = outer;
    InsetRect( &outer, -1000, -4 );         /* rect for deleting   */ /* <SC 07/20/88> */
    InsetRect( &drag, 4, 4 );               /* rect for pinning    */
    drag.bottom = drag.top + 128;           /* only top half       */
    bounds = drag;
    InsetRect( &bounds, 0, -3 );            /* rect for clipping   */ draggeur = 0;                           /* no indicator        */ while (StillDown()) {
        GetMouse( &pt );

if (PtInRect( pt, &outer )) {
            if (!inside) {
                p = *env->knots;
                *((long *)&pt) = PinRect( &drag, pt );
                for (knot=0;knot<env->nKnots-1;knot++) if (p++->h > pt.h ) break;
                Munger( env->knots, knot*4, (Ptr)1, 0, &pt, 4 );
                env->nKnots++;
            } inside = True;

p = *env->knots + knot;
            if (knot > 0) {
                bounds.left = (p-1)->h + 2;
                if (knot < env->nKnots-1)
                    bounds.right = (p+1)->h - 2;
                else
                    bounds.left = bounds.right = drag.right;
            }
            else {
                bounds.left = bounds.right = drag.left;
            }

*((long *)&pt) = PinRect( &drag, pt );
            if (pt.h < bounds.left) pt.h = bounds.left;
            if (pt.h > bounds.right) pt.h = bounds.right;

if (!EqualPt( *p, pt)) {
                if (knot == 0) {              /* setup clip */
                    bounds.left = drag.left;
                    bounds.right = (p+1)->h;
                }
                if (knot == env->nKnots-1) {
                    bounds.left = (p-1)->h;
                    bounds.right = drag.right;
                }
                InsetRect( &bounds, -3, 0 );

if (draggeur) DragKnotInd( drag.left, draggeur );/* draw indicator */
                draggeur = pt.v;
                DragKnotInd( drag.left, draggeur );

*p = pt;

ClipRect( &bounds );           /* draw wave */
                DrawEnvelope( dlg, waveItem );
                ClipRect( &dlg->portRect );
            }
        }
        else {
            if (draggeur) DragKnotInd( drag.left, draggeur );
            draggeur = 0;
```

```
            if ((inside) && (knot > 0) && (knot < env->nKnots-1)) {
                Munger( env->knots, knot*4, NIL, 4, (Ptr)1, 0);
                env->nKnots--;
                DrawEnvelope( dlg, waveItem );
                inside = False;
            }
        }
    }
    if (draggeur) DragKnotInd( drag.left, draggeur );
}

DragKnotInd( h, v )
short   h, v;
{
    PenNormal();                        /* draw indicator */
    PenMode( patXor );
    MoveTo( h - 27, v );
    Line( 6, 0 );
    PenNormal();
}

DrawKnots( env )
register EnvelopePtr    env;
{
    short   i;
    Point   pt;
    Rect    r;

for (i=0;i<env->nKnots;i++) {
        pt = *(*env->knots + i);
        PenSize( 2, 2 );
        if (i)
            LineTo( pt.h, pt.v );
        else
            MoveTo( pt.h, pt.v );

PenSize( 3, 3 );
        SetRect( &r, -2, -2, 4, 4 );
        OffsetRect( &r, pt.h, pt.v );
        FrameRect( &r );
    }
} pascal void DrawEnvelope( dlg, item )
DialogPtr   dlg;
short       item;
{
    short           kind;
    Handle          h;
    Rect            r;
    BitMap          bm;
    Effect          *efx;
    EnvelopePtr     env;
    register short  half;
    char            str[32];

efx = (Effect *)GetWRefCon( dlg );
    env = (EnvelopePtr)*efx->h;

PenNormal();
    GetDItem( dlg, item, &kind, &h, &r );
    bm.bounds = r;
    InsetRect( &bm.bounds, 4, 4 );
    FrameRect( &r );
    InsetRect( &r, 1, 1 );
    PenMode( srcBic );
    PenSize( 3, 3 );
    FrameRect( &r );
    PenNormal();

HLock( env->off );
    bm.rowBytes = ((bm.bounds.right - bm.bounds.left + 15) >> 4) << 1;
    bm.baseAddr = *env->off;
    CopyBits( &bm, &dlg->portBits, &bm.bounds, &bm.bounds, srcCopy, NIL );
    HUnlock( env->off );

DrawKnots( env );

PenNormal();
    TextFont( 1 );
    TextSize( 9 );
    GetDItem( dlg, 7, &kind, &h, &r );
    FrameRect( &r );
    InsetRect( &r, 1, 1 );
    EraseRect( &r );
```

```
    InsetRect( &r, -1, 3 );

half = (r.bottom+r.top) / 2/* -1*/;

MoveTo( r.right-6, r.top );
    Line( 5, 0 );
    MoveTo( r.right-4, r.top + (r.bottom-r.top) / 8 );
    Line( 3, 0 );
    MoveTo( r.right-6, r.top + (r.bottom-r.top) / 4 );
    Line( 5, 0 );
    MoveTo( r.right-4, half - (r.bottom-r.top) / 8 );
    Line( 3, 0 );
    MoveTo( r.right-6, half );
    Line( 5, 0 );
    MoveTo( r.right-4, half + (r.bottom-r.top) / 8 );
    Line( 3, 0 );
    MoveTo( r.right-6, r.bottom - (r.bottom-r.top) / 4 );
    Line( 5, 0 );
    MoveTo( r.right-4, r.bottom - (r.bottom-r.top) / 8 );
    Line( 3, 0 );
    MoveTo( r.right-6, r.bottom );
    Line( 5, 0 );

NumToString( env->range, &str[0] );
    MoveTo( r.right-7, r.top + 5 );
    Move( -StringWidth( &str[0] ), 0 );
    DrawString( &str[0] );

MoveTo( r.right-7, half + 4 );
    Move( -CharWidth( '0' ), 0 );
    DrawChar( '0' );

NumToString( -env->range, &str[0] );
    MoveTo( r.right-7, r.bottom+2 );
    Move( -StringWidth( &str[0] ), 0 );
    DrawString( &str[0] );

TextFont( 0 );
    TextSize( 0 );
}
```

---

MiscTools.c

```
/*
    MiscTools.c
    ©1987 Steve Capps

Modification History:
    --------------------

<JS  12/06/87>  Put handle in A0 before NGetState in SafeLock.
    <JS  12/10/87>  Remove trailing zeroes in FixedToString.

------------------------------------------------------------------

<SC  02/05/88>  Fix sloppy code in OpenResFileV which was catching a spurious nonzero
                    ResError from Andy's GetResource patch in the Radius Accelerator ROM.
    <SC  05/15/88>  handle negative numbers in FixedToString.
    <JS  06/01/88>  Don't let file/dir search fall into PMSP.
    <JS  06/02/88>  Use FSFCBLen instead of ROM85 to test for HFS.
    <SMR 06/22/88>  Handle color dialogs in GetDialog.
    <SMR 06/24/88>  correct color grafport checks; improved CheapCompare; make sure there's
                    a frontmost window before deactivating it in GetDialog.
    <SMR 09/27/88>  Check for overflow from StringToFixed before pinning num in StringToFixedX.
    <SMR 09/28/88>  Don't round numbers larger than 0x7FFFFFFC in FixedToString because
                    the rounding overflows and the number becomes negative.
    <SMR 10/01/88>  Added IO error string for accessDenied (access privilege error) in
                    IOAlert.
    <SMR 10/05/88>  Cast 0x7FFFFFFC to a long int before comparing it to num in
                    FixedToString (otherwise num will be converted to an unsigned long
                    int and the comparison will fail for negative values).

*/
#include <MacHeaders>
#include "Color.h"
#include "MiscDefs.c"
#include "FixedFract.h"         /* JS - 12/15/87 */

/* exported by users of this package */ extern          UpdateWindows( void );

extern  short   errorBase;      /* index of first IO error string in STR# 100 */
extern  short   rangeBase;      /* index of first range error string in STR# 100 */
extern  char    decimalPoint;   /* decimal point character */
extern  char    minusSign;      /* minus sign character */
```

```c
/* private stuff */ short       AlertGuts( char *, short, short );

short   Abs( x )
short   x;
{
    if (x > 0) return(x);
    return(-x);
}

/* does a cheap distance calc between two points */
short   ABSPoint( pt1, pt2 )
Point   pt1, pt2;
{
    asm {
        MOVEM   pt1(A6),D0-D1   ; get first point into D1 D0
        SUB.W   pt2(A6),D0      ; get delta V
        BPL.S   @0
        NEG     D0
@0
        SUB.W   pt2+2(A6),D1    ; get delta H
        BPL.S   @1
        NEG     D1
@1
        CMP     D1,D0           ; is dv > dh
        BGT.S   @2
        EXG     D1,D0           ; flip the two
@2
        ASR     #1,D1           ; shift the lesser of the two ADD     D1, D0          ; get total -- sqrt
    }
}

/* adds character to end of str */
AddChar( str, c )
char *str, c;
{
    *(str + (++(*str)) ) = c;
}

/* concatenates right to left string */
AddStr ( strLeft, strRight )
char    *strLeft, *strRight;
{
    register short  x;

x = *strRight++;
    BlockMove( strRight, strLeft+*strLeft+1, x );
    *strLeft += x;
}

/* used by IOAlert, ErrorAlert, et al. */
short AlertGuts( str, strID, id )
char    *str;
short   strID;
short   id;
{
    char    holder[256];
    short   x;

InitCursor();

if (strID) GetIndString( &holder[0], 100, strID );

if (holder[1] != '*' ) {
        ParamText( &holder[0], str, 0, 0 );

x = AlertX( id );
        UpdateWindows();
        return( x );
    }
    else {
        return (0x01);
    }
}

/* Cover of alert which centers alert on screen */
AlertX( id )
short   id;
{
    Rect    **h, save;
    short   item;
```

```c
    h = (Rect **)GetResource( 'ALRT', id );
    save = **h;
    OffsetRect( *h, (screenBits.bounds.right - save.right - save.left) / 2, 0 );

item = Alert( id, NIL );

**h = save;
    return( item );
}

/* Draws the picture id at given location of current port */
BlastPic( id, h, v )
short   id,h,v;
{
    register PicHandle  pict;
    Rect                r;
    short               locked;

pict = GetPicture(id);
    if (pict) {
        HNoPurge( pict );
        r = (*pict)->picFrame;
        OffsetRect( &r, h-r.left, v-r.top );
        DrawPicture( pict, &r );
        HPurge( pict );
    }
}

/* cheap, simple version of textBox */
BoxString( str, h, v, just )
char    *str;
short   h;
short   v;
short   just;
{
    register short  w;
    Rect            r;
    FontInfo        inf;

GetFontInfo( &inf );

w = StringWidth( str );
    SetRect( &r, 0, 0, w, inf.ascent+inf.descent );

if (just == teJustLeft) w = 0;
    else if (just == teJustCenter) w >>= 1;

OffsetRect( &r, h-w, v );
    EraseRect( &r );
    MoveTo( r.left, v+inf.ascent );
    DrawString( str );
}

/* Not INTL compare à la StdFile */
short CheapCompare( a, b )
    register char   *a;
    register char   *b;
{
    register short  i, j;
    short           aLen, bLen;
    register char   c1, c2;
    static char     uCase[256] = { 0x00, 0x01, 0x02, 0x03, 0x04, 0x05, 0x06, 0x07, 0x08, 0x09, 0x0A, 0x0B, 0x0C, 0x0D, 0x0E,
                    0x10, 0x11, 0x12, 0x13, 0x14, 0x15, 0x16, 0x17, 0x18, 0x19, 0x1A, 0x1B, 0x1C, 0x1D, 0x1E, 0x1F,
                    0x20, 0x21, 0x22, 0x23, 0x24, 0x25, 0x26, 0x27, 0x28, 0x29, 0x2A, 0x2B, 0x2C, 0x2D, 0x2E, 0x2F,
                    0x30, 0x31, 0x32, 0x33, 0x34, 0x35, 0x36, 0x37, 0x38, 0x39, 0x3A, 0x3B, 0x3C, 0x3D, 0x3E, 0x3F,
                    0x40, 0x41, 0x42, 0x43, 0x44, 0x45, 0x46, 0x47, 0x48, 0x49, 0x4A, 0x4B, 0x4C, 0x4D, 0x4E, 0x4F,
                    0x50, 0x51, 0x52, 0x53, 0x54, 0x55, 0x56, 0x57, 0x58, 0x59, 0x5A, 0x5B, 0x5C, 0x5D, 0x5E, 0x5F,
                    0x60, 0x41, 0x42, 0x43, 0x44, 0x45, 0x46, 0x47, 0x48, 0x49, 0x4A, 0x4B, 0x4C, 0x4D, 0x4E, 0x4F,
                    0x50, 0x51, 0x52, 0x53, 0x54, 0x55, 0x56, 0x57, 0x58, 0x59, 0x5A, 0x7B, 0x7C, 0x7D, 0x7E, 0x7F,
                    0x80, 0x81, 0x82, 0x83, 0x84, 0x85, 0x86, 0x87, 0x88, 0x89, 0x8A, 0x8B, 0x8C, 0x8D, 0x8E, 0x8F,
                    0x90, 0x91, 0x92, 0x93, 0x94, 0x95, 0x96, 0x97, 0x98, 0x99, 0x9A, 0x9B, 0x9C, 0x9D, 0x9E, 0x9F,
                    0xA0, 0xA1, 0xA2, 0xA3, 0xA4, 0xA5, 0xA6, 0xA7, 0xA8, 0xA9, 0xAA, 0xAB, 0xAC, 0xAD, 0xAE, 0xAF,
                    0xB0, 0xB1, 0xB2, 0xB3, 0xB4, 0xB5, 0xB6, 0xB7, 0xB8, 0xB9, 0xBA, 0xBB, 0xBC, 0xBD, 0xBE, 0xBF,
                    0xC0, 0xC1, 0xC2, 0xC3, 0xC4, 0xC5, 0xC6, 0xC7, 0xC8, 0xC9, 0xCA, 0xCB, 0xCC, 0xCD, 0xCE, 0xCF,
                    0xD0, 0xD1, 0xD2, 0xD3, 0xD4, 0xD5, 0xD6, 0xD7, 0xD8, 0xD9, 0xDA, 0xDB, 0xDC, 0xDD, 0xDE, 0xDF,
                    0xE0, 0xE1, 0xE2, 0xE3, 0xE4, 0xE5, 0xE6, 0xE7, 0xE8, 0xE9, 0xEA, 0xEB, 0xEC, 0xED, 0xEE, 0xEF,
                    0xF0, 0xF1, 0xF2, 0xF3, 0xF4, 0xF5, 0xF6, 0xF7, 0xF8, 0xF9, 0xFA, 0xFB, 0xFC, 0xFD, 0xFE, 0xFF };

i = 0;
    aLen = *a++;
    bLen = *b++;
    j = (aLen < bLen) ? aLen : bLen;
    while ( i < j ) {
        c1 = uCase[*a++];
        c2 = uCase[*b++];
        if (c1 < c2) return(-1);
```

```c
            if (c1 > c2) return(1);
            i++;
        }
        if (aLen < bLen) return(-1);
        if (aLen > bLen) return(1);
        return(0);
}

/* clears given range */
ClearBytes( p, l )
Ptr p;
long    l;
{
    asm {
        MOVE.L  p(A6),A0
        MOVE.L  l(A6),D0

MOVE.L  A0,D1           ; see if odd
        BTST    #0,D1
        BNE.S   @3
@0
        SUBQ.L  #4,D0           ; do long at a time
        BLE.S   @1
        CLR.L   (A0)+
        BRA.S   @0
@1
        ADDQ    #3,D0           ; residue
@2
        CLR.B   (A0)+
@3
        DBRA    D0,@2
    }
}

/* Zeroes out contents of handle */
ClearHandle( h )
Handle  h;
{
    ClearBytes( *h, GetHandleSize( h ) );
}

/* does a 2way alert with OK/cancel */
short ConfirmAlert( str, strID )
char    *str;
short   strID;
{
    return( AlertGuts( str, strID, 100 ) == 1);
}

/* does a 3 way alert w/Yes,No and cancel */
short Confirm3Alert( str, strID )
char    *str;
short   strID;
{
    return( AlertGuts( str, strID, 101 ) );
} short CoolDigit( c )
char    c;
{
    if (c == decimalPoint) return(True);
    if (c == minusSign) return(True);
    return ((c >= '0') && (c <= '9') );
}

/* deletes n chars at off from str, if off is negative, starts at right */
DeleteChars( str, off, n )
register char * str;
register short  off;
register short  n;
{
    if (off < 0) off += *str + 1;
    if ((off <= *str) && (off > 0)) {
        BlockMove( str+off+n, str+off, *str - (off + n) + 1 );
        (*str)-=n;
    }
}

/* given h and v, it derives the nearest byte address from thePort of that screen location*/

Ptr DeriveAddress( h, v )
short   h, v;
{
    register BitMap     *bm;
    short               depth;
```

```
    if ((thePort->portBits.rowBytes & 0xC000) == 0xC000) {        /* <SMR 06/24/88> */
        bm = (BitMap *)*(PixMapHandle)thePort->portBits.baseAddr;
        depth = ((PixMapPtr)bm)->pixelSize;
    }
    else {
        bm = &thePort->portBits;
        depth = 1;
    }
    return( bm->baseAddr +
            (v - bm->bounds.top) * (long)(bm->rowBytes & 0x1FFF) +
            (((h-bm->bounds.left) >> 3)) * depth );
}

DumpHandle( h, pb )
register Handle    h;
ParmBlkPtr         pb;
{
    short   locked;

locked = SafeLock( h );
    DumpPointer( *h, GetHandleSize( h ), pb );
    if (locked) HUnlock( h );
}

DumpPointer( p, l, pb )
Ptr        p;
long       l;
ParmBlkPtr pb;
{
    short      x;

pb->ioParam.ioBuffer = p;
    pb->ioParam.ioReqCount = l;
    pb->ioParam.ioPosMode = 0;
    x = PBWrite( pb, 0 );
}

/* returns true if passed vRefNum is ejectable or not */
short Ejectable( vRefNum )
short   vRefNum;
{
    register Ptr    dqe;

dqe = (Ptr)GetDQE( GetDriveNum( vRefNum ) );
    if (dqe) {
        if (*(dqe-3) < 8) return(True);         /* strange DQDip field */
    }
    return(False);
}

/* Enables/disables a dialog control item */
EnableCtlItem( dlg, item, enable )
DialogPtr   dlg;
short       item;
short       enable;
{
    Rect            r;
    ControlHandle   h;

enable = enable ? 0 : 255;
    GetDItem( dlg, item, &r, &h, &r );
    if ((*h)->contrlHilite != enable) HiliteControl( h, enable );
}

/* Brings up an alert with a simple OK button */
ErrorAlert( str, strID )
char    *str;
short   strID;
{
    AlertGuts( str, strID, 102 );
}

/* extracts length bytes at offset from h and puts into new at offset */
/* if newOff < 0 it assumes newOff = GetHandleSize( new) which means concatenate */
/* Note, this requires < 50 bytes free in heap (but it'll be slow) */ short ExtractHandle( h, offset, length, new, newOff )
Handle  h;
long    offset;
long    length;
Handle  *new;
long    newOff;
{
```

```
    long        x;
    register long  result;
    short       locked;

if (!GetHandleSize(*new)) {
        DisposHandle( *new );
        *new = NewHandle( CompactMem(0x7FFFFFFF) );
        SetHandleSize( *new, 0 );
    }

/* clean up parameters */
    result = GetHandleSize( *new );
    if (newOff > result) newOff = result;
    if (newOff < 0) newOff = result;

result = GetHandleSize( h ) - offset;
    if (result < length) length = result;

result = 0;
    while (length > 0) {
        x = CompactMem(0x7FFFFFFF);
        if (x > length) x = length;

locked = SafeLock( h );
        result = MungerX( *new, newOff, NIL, 0, *h + offset, x );
        if (locked) HUnlock( h );
        if (result < 0) break;

if ((result = MungerX( h, offset, NIL, x, (Ptr)1, NIL )) < 0) break;

/* turn on the watch if we didn't make it cleanly */
        if (x < (length >> 2) ) WatchCursor();

length -= x;
        newOff += x;

}
    if (result < 0) return(result);
    return( 0 );
}

/* Fills the given pointer-len pretty quickly */

Filler( p, len, byte )
Ptr     p;
long    len;
char    byte;
{
    asm {
        MOVE.B      byte(A6),D1
        MOVE.L      len(A6),D0
        MOVE.L      p(A6),A0

TST.B       0x012F          ; is there an 020 ?
        BGT.S       @0

BTST        #0,p+3(A6)
        BNE.S       @loop2          ; if odd, we must go byte by byte
    @0
        LSL         #8,D1           ; build up a long
        MOVE.B      byte(A6),D1
        MOVE        D1,A1
        SWAP        D1
        MOVE        A1,D1           ; long of magic byte MOVE.L      len(A6),D0
        LSR.L       #2,D0
        BEQ.S       @almost
    @loop
        MOVE.L      D1,(A0)+
        SUBQ.L      #1,D0
        BNE.S       @loop
    @almost
        MOVEQ       #3,D0
        AND         len+2(A6),D0
        BEQ.S       @done
    @loop2
        MOVE.B      D1,(A0)+
        SUBQ.L      #1,D0
        BNE.S       @loop2
    @done
    }
}

FixedToString( num, str )
    Fixed       num;
    char        *str;
```

```
{
    char        temp[16];
    unsigned short  x;
    long        save;                                       /* <SC  05/15/88> */
    Fixed       frac;                                       /* <SC  05/15/88> */ if(num <= (long)0x7FFFFFFC) /* don't turn large positive into negative */  /* <SMR 10/05/88> */
        num+=3;                 /* round off to 4 DECIMAL places   */
    x = num;
    save = num;                                 /* handle negative case    */ /* <SC  05/15/88> */
    num >>= 16;                                                               /* <SC  05/15/88> */
    NumToString( num, str );                                                  /* <SC  05/15/88> */ if ( (frac = x*10000L >> 16) != 0 ) {   /* no trailing zeroes */  /* <JS  12/10/87> */
        if (save < 0) {                     /* handle negative case */ /* <SC  05/15/88> */
            num++;                                                        /* <SC  05/15/88> */
            if (num)                                                      /* <SC  05/15/88> */
                NumToString( num, str );                                  /* <SC  05/15/88> */
            else {                                                        /* <SC  05/15/88> */
                str[0] = 1;                                               /* <SC  05/15/88> */
                str[1] = '-';                                             /* <SC  05/15/88> */
            }                                                             /* <SC  05/15/88> */
                                                                          /* <SC  05/15/88> */
            frac = 10000 - frac;                                          /* <SC  05/15/88> */
        }                                                                 /* <SC  05/15/88> */
        AddChar( str, decimalPoint );

NumToString( frac, temp );                                        /* <SC  05/15/88> */
        x = 4 - temp[0];
        while (x--) AddChar(str, '0');
        while (temp[temp[0]] == '0') temp[0]--;
        AddStr( str, temp );
    }
}

/* returns depth of thePort */
Ptr GetBase()
{
    register PixMapPtr  pm;

if ((thePort->portBits.rowBytes & 0xC000) == 0xC000) {
        pm = *(PixMapHandle)thePort->portBits.baseAddr;
        return( pm->baseAddr );
    }
    else
        return( thePort->portBits.baseAddr );
}

/* returns ptr to bounds rect (can be to handle) */
Rect *GetBounds( )
{
    register BitMap    *bm;

if ((thePort->portBits.rowBytes & 0xC000) == 0xC000)                /* <SMR 06/24/88> */
        bm = (BitMap *)*(PixMapHandle)thePort->portBits.baseAddr;
    else
        bm = &thePort->portBits;
    return( &bm->bounds );
}

/* Gets the value of the control item */
short GetCtlItem( dlg, item )
DialogPtr   dlg;
short       item;
{
    Rect            r;
    ControlHandle   h;
    char            text[32];

GetDItem( dlg, item, &r, &h, &r);
    return( GetCtlValue(h) );
}

/* returns depth of thePort */
short GetDepth()
{
    register PixMapPtr  pm;

if ((thePort->portBits.rowBytes & 0xC000) == 0xC000) {              /* <SMR 06/24/88> */
        pm = *(PixMapHandle)thePort->portBits.baseAddr;
        return( pm->pixelSize );
    }
    else
        return( 1 );
}
```

```
/* Gets the INVISIBLE dialog, centers it, then shows it */
DialogPtr GetDialog( id )
    short       id;
{
    DialogPtr   dlg;
    GrafPtr     port;                                           /* <SMR 06/23/88> */
    Rect        *br;                                            /* <SMR 06/23/88> */
    short       vGlobal;                                        /* <SMR 06/23/88> */ dlg = GetNewDialog( id, 0L, -1L );
    GetPort( &port );                                           /* <SMR 06/23/88> */
    SetPort( dlg );                                             /* <SMR 06/23/88> */
    br = GetBounds();                                           /* <SMR 06/23/88> */
    SetPort( port );                                            /* <SMR 06/23/88> */
    vGlobal = -br->top;                                         /* <SMR 06/23/88> */

MoveWindow( dlg,
        (screenBits.bounds.right-(dlg->portRect.right-dlg->portRect.left)) / 2,
        vGlobal, 1 );                                           /* <SMR 06/23/88> */
    ShowWindow( dlg );

return( dlg );
}

/* Gets drive queue element for passed drive number */
DrvQElPtr GetDQE(drive)
short   drive;
{
    register DrvQElPtr  dqe;

dqe = (DrvQElPtr)DrvQHdr.qHead;
    while (dqe) {
        if (dqe->dQDrive == drive) break;
        dqe = (DrvQElPtr)dqe->qLink;
    } return(dqe);
}

/* returns real drive if disk online, -1 if offline or error */
short GetDriveNum( vRefNum )
short   vRefNum;
{
    register VCB    *vcb;

vcb = GetVCB( GetRealVRef( vRefNum ) );
    if (vcb) {
        if (vcb->vcbDrvNum) return(vcb->vcbDrvNum);
        if (vcb->vcbDRefNum < 0) return(-vcb->vcbDRefNum);
    }
    return( -1 );
}

/* Gets the text item from dialog, converts to number and pins it in range */
Fixed GetFixedItem( dlg, item, low, hi )
DialogPtr   dlg;
short       item;
Fixed       low, hi;
{
    Rect        r;
    Handle      h;
    char        text[256];

GetDItem( dlg, item, &r, &h, &r );
    GetIText( h, text );
    return (StringToFixedX( text, low, hi ) );
}

/* Like GetIndString, but for REC# rect lists */
GetIndRect( r, id, n )
register Rect   *r;
short           id;
short           n;
{
    Handle          h;
    register Rect   *p;

r->top = 0;
    r->left = 0;
    r->bottom = 0;
    r->right = 0;

h = GetResource( 'REC#', id );
    p = (Rect *) (*h);
```

```
    if ((h) && (n <= *((short *)p)) ) {
        p = (Rect *)(((char *)p)+2);
        *r = *(p+n-1);
    }
}

/* Gets text item from dialog */
Handle GetItemHand( dlg, item )
DialogPtr   dlg;
short       item;
{
    short   kind;
    Handle  h;
    Rect    r;

GetDItem( dlg, item, &kind, &h, &r);
    return( h );
}
/* Gets text item from dialog */
GetItemRect( dlg, item, r )
DialogPtr   dlg;
short       item;
Rect        *r;
{
    short   kind;
    Handle  h;

GetDItem( dlg, item, &kind, &h, r);
}

/* Gets the text item from dialog, converts to number and pins it in range */
long GetNumItem( dlg, item, low, hi )
DialogPtr   dlg;
short       item;
long        low, hi;
{
    Rect        r;
    Handle      h;
    char        text[256];

GetDItem( dlg, item, &r, &h, &r);
    GetIText( h, text );
    return( StringToNumX( text, low, hi ) );
}

/* Returns real vRefNum from WDRefNum, etc. (Can't accept drive numbers) */
short GetRealVRef(vRefNum)
short   vRefNum;
{
    WDPBRec         wd;

if (vRefNum < 0) {
        if ((vRefNum < 0x8FFF) && (FSFCBLen > 0)) {
            wd.ioNamePtr = 0;
            wd.ioVRefNum = vRefNum;
            wd.ioWDDirID = 0;
            PBGetWDInfo(&wd, False);
            return( wd.ioWDVRefNum );
        }
        return( vRefNum );
    }
    return(-1);

}

/* returns rowBytes of thePort */
short GetRowBytes()
{
    register BitMap     *bm;

if ((thePort->portBits.rowBytes & 0xC000) == 0xC000)            /* <SMR 06/24/88> */
        bm = (BitMap *)*(PixMapHandle)thePort->portBits.baseAddr;
    else
        bm = &thePort->portBits;
    return( bm->rowBytes & 0x1FFF );
}

/* Gets text item from dialog */
GetTextItem( dlg, item, str )
DialogPtr   dlg;
short       item;
```

```
char      *str;
{
    Rect            r;
    ControlHandle   h;

GetDItem( dlg, item, &r, &h, &r );
    GetIText( h, str );
}
/* get vcb queue element for passed vRefNum or WDRefNum */
VCB *GetVCB(vRefNum)
short   vRefNum;
{
    register VCB    *vcb;
    vcb = (VCB *)VCBQHdr.qHead;
    while (vcb) {
        if (vcb->vcbVRefNum == vRefNum) break;
        vcb = (VCB *)vcb->qLink;
    }
    return(vcb);
} short HitLine( pt1, pt2, test )
Point   pt1, pt2, test;
{
    #define selectGrav 5 short           try;
    register short  dv, dh;

dv = pt2.v - pt1.v;
    dh = pt2.h - pt1.h;
    if (Abs(dv) > Abs(dh)) {
        if ( ((test.v >= pt1.v-selectGrav) && (test.v <= pt2.v+selectGrav)) ||
             ((test.v <= pt1.v+selectGrav) && (test.v >= pt2.v-selectGrav)) )
        {
            try = pt1.h + HiWord( (test.v - pt1.v) * FixRatio( dh, dv ) );
            if (Abs(try-test.h) < selectGrav) return(True);
        }
    }
    else {
        if ( ((test.h >= pt1.h-selectGrav) && (test.h <= pt2.h+selectGrav)) ||
             ((test.h <= pt1.h+selectGrav) && (test.h >= pt2.h-selectGrav)) )
        {
            try = pt1.v + HiWord( (test.h - pt1.h) * FixRatio( dv, dh ) );
            if (Abs(try-test.v) < selectGrav) return(True);
        }
    }
    return(False);
}

/* cover of HomeResFile which fixes anomoly with system (0 vs. 2) */
short HomeResFileX( h )
Handle h;
{
    register short  x;

x = HomeResFile( h );
    if (!x) x = SysMap;
    return( x );
}

/* fill the handle h at offset off with len bytes of byte. If off = -1 add to end */
short InsertFill( h, off, len, byte )
Handle  h;
long    off;
long    len;
char    byte;
{
    long    x;

x = GetHandleSize( h );
    if ((off < 0) || (off > x)) off = x;

x = SafeReplace( h, off, 0, (Ptr)1, len );      /* insert len bytes of garbage */ if (x < 0) return( x );
    Filler( *h + off, len, byte );
    return( 0 );
}

/* if error != 0, brings up a mildly intelligible alert */
IOAlert( str, error )
char    *str;
short   error;
```

```
{
    char    num[20];
    num[0] = 0;
    switch (error) {
        case 0: return;
        case dskFulErr: {
            error = 1;
            break;
        }
        case wPrErr: {
            error = 2;
            break;
        }
        case fLckdErr: {
            error = 3;
            break;
        }
        case dupFNErr: {
            error = 4;
            break;
        }
        case fBsyErr: {
            error = 5;
            break;
        }
        case fnfErr: {
            error = 6;
            break;
        }
        case opWrErr: {
            error = 7;
            break;
        }
        case accessDenied: {
            error = 8;
            break;
        }
        default: {
            NumToString( error, &num[0] );
            ParamText( NIL, NIL, &num[0], NIL );
            error = 0;
            break;
        }
    }
    ErrorAlert( str, error + errorBase );       /* IO errors start at errorBase */
}

/* inserts the character at offset into str, if negative from right */
InsertChar( str, c, off )
register char * str;
char            c;
register short  off;
{
    if (off < 0) off = *str + off + 1;
    if (off > *str) off = *str + 1;

BlockMove( str+off, str+off+1, *str - off + 1 );
    *(str+off) = c;
    (*str)++;
} short max( x, y )
short   x,y;
{
    if (x > y) return(x);
    return(y);
} short MaxPixels()
{
    register short      x;
    register GDHandle   gd;

x = 1;                          /* assume max depth is 1 */

/* is color quickdraw there? */
    if (ROM85 > 0) if (NGetTrapAddress(0x200,ToolTrap) != NGetTrapAddress(0x9F,ToolTrap)) {
        gd = GetDeviceList();
        while (gd) {
            x = max( (*(*gd)->gdPMap)->pixelSize, x );
            gd = GetNextDevice( gd );
        }
    }
    return(x);
} short min( x, y )
```

```
short    x,y;
{
    if (x < y) return(x);
    return(y);
} long MungerX( h, offset, p1, len1, p2, len2 )
Handle  h;
long    offset;
Ptr     p1;
long    len1;
Ptr     p2;
long    len2;
{
    asm {

SUBQ    #4,SP
        MOVE.L  h,-(SP)
        MOVE.L  offset,-(SP)
        MOVE.L  p1,-(SP)
        MOVE.L  len1,-(SP)
        MOVE.L  p2,-(SP)
        MOVE.L  len2,-(SP)
        _Munger
        MOVE.L  (SP)+,D1

TST.L   D0              ; is there an error code ?
        BMI.S   @0
        MOVE.L  D1,D0
    ;   BRA.S   @1
    @0
    ;   DC.W    0xa9ff
    ;@1
    }
} short FileExists( name, vRefNum )
    char        *name;
    short       vRefNum;
{
    FInfo       inf;
    CInfoPBRec  pb;                                         /* <JS 06/01/88> */
    short       x;
    char        str[256];                                   /* <JS 06/01/88> */ if (FSFCBLen > 0) {                  /* use proper test for HFS */  /* <JS 06/02/88> */
        pb.hFileInfo.ioVRefNum = vRefNum;                   /* <JS 06/01/88> */
        pb.hFileInfo.ioNamePtr = (StringPtr)str;             /* <JS 06/01/88> */
        /*pb.ioParam.ioVersNum = 0;*/                        /* <JS 06/01/88> */
        pb.hFileInfo.ioFDirIndex = -1;   /* get DirID for vRefNum */    /* <JS 06/01/88> */
        pb.hFileInfo.ioDirID = 0;                            /* <JS 06/01/88> */
        x = PBGetCatInfo( &pb, False );                      /* <JS 06/01/88> */ pb.hFileInfo.ioNamePtr = (StringPtr)name;            /* <JS 06/01/88> */
        pb.hFileInfo.ioFDirIndex = 0;                        /* <JS 06/01/88> */
        x = PBGetCatInfo( &pb, False );
        if (!x && pb.hFileInfo.ioFlAttrib & 0x0010) x = bdNamErr;  /* <JS 06/01/88> */
    }
    else
        x = GetFInfo( name, vRefNum, &inf );

return( x );
}

* Returns true if passed vRefNum or WDRefNum is online (returns error on drive #'s( > 0))*/ short Online (vRefNum)
short   vRefNum;
{
    register VCB    *vcb;

if (vRefNum < 0) {
        vcb = GetVCB( GetRealVRef(vRefNum) );
        if (vcb) return( (vcb->vcbDrvNum) || (vcb->vcbDRefNum < 0) );
    }
    return (-1);                    /* return error */
}

/* Expanded open resfile for volumes, optionally creates */
short OpenResFileV( name, vRefNum, createOK )
char    *name;
short   vRefNum;
short   createOK;
{
    short saveVol, ref;
```

```
    GetVol( 0, &saveVol );
    SetVol( 0, vRefNum );

if (createOK) {            /* Fix sloppy code which caught nonzero */  /* <SC 02/05/88> */
        CreateResFile( name );  /* ResError left by Andy's GetResource   */  /* <SC 02/05/88> */
        ref = ResError();       /* patch in the Radius Accelerator ROM   */  /* <SC 02/05/88> */
    }                                                                     /* <SC 02/05/88> */
    else                                                                  /* <SC 02/05/88> */
        ref = 0;                                                          /* <SC 02/05/88> */
                                                                          /* <SC 02/05/88> */
    if (!ref || (ref == dupFNErr) || (ref == opWrErr)) ref = OpenResFile( name );

SetVol( 0, saveVol );
    return( ref );
} long PinRectX( r, pt )
Rect    *r;
Point   pt;
{
    asm {
        MOVE    pt(A6),D0
        MOVE    pt+2(A6),D1

MOVE.L  r(A6),A0
        CMP     (A0)+,D0      ; top
        BGE.S   @0
        MOVE    -2(A0),D0
    @0
        CMP     (A0)+,D1      ; left
        BGE.S   @1
        MOVE    -2(A0),D1
    @1
        CMP     (A0)+,D0      ; bottom
        BLE.S   @2
        MOVE    -2(A0),D0
    @2
        CMP     (A0),D1       ; right
        BLE.S   @3
        MOVE    (A0),D1
    @3
        SWAP    D0
        MOVE    D1,D0         ; return point
    }
}

/* Returns random number betwwen 0 and x-1*/
short Rand( x )
short x;
{
    short   y;
    y = Random() % x;
    if (y < 0) y = -y;
    return(y);
}

/* SafeOpenRes opens the given resource file à la OpenResFileV, but w/o preload */
short SafeOpenRes( name, vRefNum, createOK, topRes )
char    *name;
short   vRefNum;
short   createOK;
short   *topRes;
{
    short   res;

*topRes = CurResFile();
    SetResLoad(False);
    res = OpenResFileV( name, vRefNum, createOK );

if (res > 0) UseResFile( res );

SetResLoad(True);
    return( res );
}

/* SafeCloseRes closes resource file opened w/SafeOpenRes and correctly maintains search list */
short SafeCloseRes( res, topRes )
short   res;
short   topRes;
{
    UpdateResFile( res );
    if (res > topRes) CloseResFile( res );
    UseResFile( topRes );
}
```

```
/* does a protected munger call in won't delete parts outside handle */
short SafeReplace( h, offset, outLen, in, inLen )
Handle      h;
long        offset;
long        outLen;
Ptr         in;
long        inLen;
{
    register long   l;

l = GetHandleSize( h );
    if (offset > l) offset = l;                         /* pin offset */
    if ((offset+outLen) > l) outLen = l - offset;       /* pin cut amt */
    if (in == (Ptr)l) in = (Ptr)GetZone();              /* safer address */

/*MoveHHi( h );                                     /* cause we're cool */ l = MungerX( h, offset, NIL, outLen, in, inLen );
    if (l < 0) return( l );
    return( 0 );
}

/* locks the handle after moving hi and returns lock state before lock */ short SafeLock( h )
register Handle h;
{
extern MoveHHi();

asm {

MOVE.B      (h),D0          ; assume old rom's

TST         ROM85           ; new rom's ?
            BMI.S       @0
            MOVE.L      h,A0            ;       JS: 12/06/87
            _HGetState
    @0
            TST.B       D0              ; test lock bit
            SMI         -(SP)           ; TRUE if not locked
            ADDQ.B      #1,(SP)         ; return it
            BEQ.S       @1              ; if already locked, can't move anyway
            MOVE.L      h,-(SP)
            JSR         MoveHHi
    @1
            MOVE.L      h,A0
            _HLock                      ; finally lock it

MOVE.B      (SP)+,D0
            EXT         D0
    }
}

RestoreUnder( r, offBits )
Rect    *r;
Handle  offBits;
{
    short           depth;
    BitMap          off;
    PixMapHandle    offPix;

depth = GetDepth();

off.bounds = *r;
    off.rowBytes = ((off.bounds.right - off.bounds.left + 15) >> 4) << 1;

if (depth > 1) {
        offPix = (PixMapHandle)*((long *)*offBits);     /* retrieve pixmap handle here */

(*offPix)->bounds = off.bounds;
        (*offPix)->rowBytes = off.rowBytes;
        (*offPix)->baseAddr = *offBits + 4;

CopyBits( offPix, &thePort->portBits, &off.bounds, &off.bounds, srcCopy, NIL );

DisposPixMap( offPix );
    }
    else {
        off.baseAddr = *offBits;
        CopyBits( &off, &thePort->portBits, &off.bounds, &off.bounds, srcCopy, NIL );
    }

DisposHandle( (Handle)offBits );
}

Handle SaveUnder( r )
Rect    *r;
```

```
{
    short           depth;
    BitMap          off;
    Handle          offBits;
    PixMapHandle    offPix;

depth = GetDepth();

off.bounds = *r;
    off.rowBytes = ((off.bounds.right - off.bounds.left + 15) >> 4) << 1;
    offBits = NewHandle( 4 + (off.bounds.bottom - off.bounds.top) * ((long)off.rowBytes) * depth);

if (depth > 1) {
        offPix = NewPixMap();
        *((long *)*offBits) = (long)offPix;        /* save pixmap handle here */

(*offPix)->bounds = off.bounds;
        (*offPix)->rowBytes = off.rowBytes;
        (*offPix)->baseAddr = *offBits + 4;

CopyBits( &thePort->portBits, offPix, &off.bounds, &off.bounds, srcCopy, NIL );
        return( offBits );
    }
    else {
        off.baseAddr = *offBits;
        CopyBits( &thePort->portBits, &off, &off.bounds, &off.bounds, srcCopy, NIL );

return( offBits );
    }
}

/*Sets the control item to given num if different(minimizes flashing) */
SetCtlItem( dlg, item, num )
DialogPtr   dlg;
short       item;
short       num;
{
    Rect            r;
    ControlHandle   h;

GetDItem( dlg, item, &r, &h, &r);
    if ((*h)->contrlValue != num) SetCtlValue( h, num );
}

/* sets the text item to ascii version of given num */
SetNumItem( dlg, item, num )
DialogPtr   dlg;
short       item;
long        num;
{
    char        text[32];

NumToString( num, text);
    SetTextItem( dlg, item, text );
}

/* Sets text item if different (minimizes flashing)*/
SetTextItem( dlg, item, str )
DialogPtr   dlg;
short       item;
char        *str;
{
    Rect            r;
    ControlHandle   h;
    char            existing[256];

GetDItem( dlg, item, &r, &h, &r);
    GetIText( h, &existing[0] );
    if (!EqualString( str, &existing[0], False, False )) SetIText( h, str );
}

/* Sets user item proc */
SetUserProc( dlg, item, proc )
DialogPtr   dlg;
short       item;
Ptr         proc;
{
    short           kind;
    Rect            r;
    ControlHandle   h;

GetDItem( dlg, item, &kind, &h, &r);
    SetDItem( dlg, item, kind, proc, &r);
}
```

```c
/* returns long version of integer as result */ long StringToFixed( str, num )
register char   *str;
Fixed           *num;
{
    register long   top, bot, factor;
    register short  len;
    char            c;
    long            temp;

top = 0;

len = *str++;
    while (len-- > 0) {
        c = *str++;
        if (c == decimalPoint) break;
        top = top*10 + (c - '0');
        if (top < 0) top = 0x7FFFFFFF;
    } factor = 1;
    bot = 0;
    while ((len-- > 0) && (factor <= 10000)) {
        temp = bot * 10 + (*str++ - '0');
        if (temp >= 0x00008000) break;
        bot = temp;
        factor = factor*10;
    }
    *num = (top << 16) + (bot << 16) / factor;

return (top);
}

Fixed StringToFixedX( str, low, hi )
register char   *str;
Fixed           low, hi;
{
    char            text[32];
    Fixed           num;
    long            overflow;
    short           bad, i;

BlockMove( str, text, 32 );
    if (((unsigned char)text[0]) > 31) text[0] = 31;

bad = 0;
    for (i=1;i<=text[0];i++) {
        if (!CoolDigit( text[i])) {
            bad = 1;
            DeleteChars( text, i, 1 );
            i--;
        }
    }
    overflow = StringToFixed( text, &num );
    if (overflow > 32767) { if (!bad) bad = 2; num = hi; }  /* check this first   */ /* <SMR 09/27/88> */
    if (num < low) { if (!bad) bad = 2; num = low;}
    if (num > hi) { if (!bad) bad = 2; num = hi; }
    /*if (overflow > 32767) { if (!bad) bad = 2; num = hi; }*/ if (bad) {
        FixedToString( num, text );
        ParamText( NIL, NIL, text, NIL );        /* pass the fixed up one */

ErrorAlert( str, rangeBase + bad - 1 );  /* bad is 1 or 2 */
    } return (num);
}

/* converts string to number and pins it in range */
long StringToNumX( str, low, hi )
char    *str;
long    low, hi;
{
    char    text[32];
    long    num;
    short   bad, i;

BlockMove( str, text, 32 );
    if (((unsigned char)text[0]) > 31) text[0] = 31;
    bad = 0;
    for (i=1;i<=text[0];i++) {
        /* escape on first occurence of period */
        if (text[i] == decimalPoint) {
            text[0] = i-1;
            break;
        }
```

```
        if (!CoolDigit(text[i])) {
            bad = 1;
            DeleteChars( text, i, 1 );
            i--;
        }
    }

StringToNum( text, &num );
    if (num < low) { if (!bad) bad = 2; num = low;}
    if (num > hi) { if (!bad) bad = 2; num = hi; } if (bad) {
        NumToString( num, text );
        ParamText( NIL, NIL, text, NIL );         /* pass the fixed up one */

ErrorAlert( str, rangeBase + bad - 1 );   /* bad is 1 or 2 */
    } return (num);
} short SuckHandle( h, pb )
register Handle    h;
ParmBlkPtr         pb;
{
    short   x, locked;

locked = SafeLock( h );
    x = SuckPointer( *h, GetHandleSize( h ), pb );
    if (locked) HUnlock( h );
    return( x );
} short SuckPointer( p, l, pb )
Ptr       p;
long      l;
ParmBlkPtr  pb;
{ pb->ioParam.ioBuffer = p;
    pb->ioParam.ioReqCount = l;
    pb->ioParam.ioPosMode = 0;
    return( PBRead( pb, 0 ) );
}

/* Toggles state of control item */
ToggleCtlItem( dlg, item )
DialogPtr  dlg;
short      item;
{
    Rect             r;
    ControlHandle    h;

GetDItem( dlg, item, &r, &h, &r);
    SetCtlValue( h, !GetCtlValue( h ) );
}

WatchCursor()
{
    SetCursor( *GetCursor( 4 ) );
}

/* allocates a zero-filled handle */
Handle ZeroHandle( size )
long   size;
{
    asm {
        MOVE.L  size(A6),D0
        DC.W    0xA322
        MOVE.L  A0,D0
    }
}

/* allocates a zero-filled pointer */
Ptr ZeroPointer( size )
long   size;
{
    asm {
        MOVE.L  size(A6),D0
        DC.W    0xA31E
        MOVE.L  A0,D0
    }
}
```

MiscDefs.c

```c
/* MiscDefs.c ©1987 Steve Capps */

/* prototypes for MiscTools.c */ ifndef True
define True    1
#endif
#ifndef False
#define False   0
endif
#ifndef NIL
define NIL     0L
endif ifndef accessDenied                                                    /* <SMR 10/01/88> */
define accessDenied    (-5000)    /* missing from FileMgr.h */         /* <SMR 10/01/88> */
endif                                                                  /* <SMR 10/01/88> */ short       Abs( short );
short       ABSPoint( Point, Point );
            AddChar( char *, char );
            AddStr ( char *, char * );
short       AlertX( short );
            BlastPic( short, short, short );
            BoxString( char *, short, short, short );
short       CheapCompare( char *, char * );
            ClearBytes( Ptr, long );
            ClearHandle( Handle );
short       ConfirmAlert( char *, short );
short       Confirm3Alert( char *, short );
short       CoolDigit( char );
            DeleteChars( char *, short, short );
Ptr         DeriveAddress( short, short );
            DumpHandle( Handle, ParmBlkPtr );
            DumpPointer( Ptr, long, ParmBlkPtr );
            EnableCtlItem( DialogPtr, short, short );
            ErrorAlert( char *, short );
short       ExtractHandle( Handle, long, long, Handle *, long );
            Filler( Ptr, long, char );
            FixedToString( Fixed, char * );
Ptr         GetBase( void );
Rect *      GetBounds( void );
short       GetCtlItem( DialogPtr, short );
short       GetDepth( void );
Fixed       GetFixedItem( DialogPtr, short, Fixed, Fixed );
DialogPtr   GetDialog( short );
            GetIndRect( Rect *, short, short );
Handle      GetItemHand( DialogPtr, short );
            GetItemRect( DialogPtr, short, Rect * );
long        GetNumItem( DialogPtr, short, long, long );
short       GetRowBytes( void );
            GetTextItem( DialogPtr, short, char * );
short       HitLine( Point, Point, Point );
short       HomeResFileX( Handle );
short       InsertFill( Handle, long, long, char );
            InsertChar( char *, char, short );
            IOAlert( char *, short );
short       max( short, short );
short       MaxPixels( void );
short       min( short, short );
long        MungerX( Handle, long, Ptr, long, Ptr, long );
short       FileExists( char *, short );
short       OpenResFileV( char *, short, short );
long        PinRectX( Rect *, Point );
short       Rand( short );
            RestoreUnder( Rect *, Handle );
short       SafeLock( Handle );
short       SafeOpenRes( char *, short, short, short * );
short       SafeCloseRes( short, short );
short       SafeReplace( Handle, long, long, Ptr, long );
Handle      SaveUnder( Rect * );
            SetCtlItem( DialogPtr, short, short );
            SetNumItem( DialogPtr, short, long );
            SetTextItem( DialogPtr, short, char * );
            SetUserProc( DialogPtr, short, Ptr );
long        StringToFixed( char *, Fixed * );
Fixed       StringToFixedX( char *, Fixed, Fixed );
long        StringToNumX( char *, long, long );
short       SuckHandle( Handle, ParmBlkPtr );
short       SuckPointer( Ptr, long, ParmBlkPtr );
            ToggleCtlItem( DialogPtr, short );
            WatchCursor( void );
Handle      ZeroHandle( long );
Ptr         ZeroPointer( long );

short       Ejectable( short );
short       GetDriveNum( short );
DrvQElPtr   GetDQE( short );
```

```
VCB        *GetVCB( short );
short      GetRealVRef( short );
short      Online( short );
```

AudioDefs.c

```
/*
    SoundTrack source (AudioDefs.c)
    Copyright ©1987-88 Farallon Computing, Inc.

Written by Steve Capps with a lot of help from:
        Mike Lameraux, Sam Roberts & Joe Sensendorf Modification History:
    -------------------

<JS  12/10/87>  Added task ptr to VBL record for Juggler background stuff

------------------------------------------------------------------------

<SMR 01/23/88>  Added undoEffect global to hold ID of last successful effect to fix bad
                    undo menu item text bug.
    <SMR 01/24/88>  Corrected dimension of rateTable which should have been maxPitch+1, not
                    maxPitch (AudioInit assigns a value to rateTable[maxPitch]). Corrected
                    definition of maxKey which should have been 95, not 96. Added inBkgnd
                    global to indicate whether we are in background.
    <SMR 01/27/88>  bracket prototype for $hit in conditional compilation directives.
    <JS  05/11/88>  Put VBL stuff in separate include file
    <JS  05/18/88>  Put Mixer defines stuff in separate include file
    <SMR 07/19/88>  Changed maxFactor from 22257 to 22255 based on call from Brian McGhie.

22Khz on the Macintosh is actually 22,254.54. Added maxFactorFixed
                    equate which is maxFactor with the repeating fraction as a Fixed.
    <SC  08/26/88>  Add selFirst and selLast fields to UndoState for saving chanFirst and
                    chanLast of selection.
    <SMR 09/15/88>  Added curTool field to GWindow to keep track of currently selected tool
                    so that we can highlight it properly.
    <SMR 10/02/88>  Added mixerLabels array to UndoState for saving mixer labels.
*/

/*
    Macintosh Include Files
*/
#include "Color.h"
#include "ColorToolbox.h"
#include "ControlMgr.h"
#include "DeskMgr.h"
#include "DialogMgr.h"
#include "EventMgr.h"
#include "FileMgr.h"
#include "FontMgr.h"
#include "HFS.h"
#include "ListMgr.h"
#include "MacTypes.h"
#include "MemoryMgr.h"
#include "MenuMgr.h"
#include "OSUtil.h"
#include "Quickdraw.h"
#include "ResourceMgr.h"
#include "ScrapMgr.h"
#include "SoundDvr.h"
#include "SoundMgr.h"
#include "StdFilePkg.h"
#include "TextEdit.h"
#include "ToolboxUtil.h"
#include "VRetraceMgr.h"
#include "WindowMgr.h"
#include "asm.h"
#include "pascal.h"

#include "MiscDefs.c"                                          /* <JS 12/14/87> */
#include "FixedFract.h"                                        /* <JS 05/11/88> */
#include "VBLstuff.h"                                          /* <JS 05/11/88> */
include "Mixer.h"                                             /* <JS 05/18/88> */ ifndef NIL
define NIL     0L
endif
#ifndef nil
#define nil     0L
#endif
#ifndef True
define True    1
#endif
#ifndef False
#define False   0
endif typedef double Extended;                                       /* <SMR 11/05/88> */
```

```
/* debug messages */
#define beta 1

/* Nominal sampling rate */
#define maxFactor       22257L                              /* <SMR 07/19/88> */
#define maxFactorFixed  0x56EE8BA3L                         /* <SMR 07/19/88> */

/* pitch of middle C for us and studio session */
#define midC 60
#define midCSS 37

/* Max pitch, 10 octaves, spread of dialog keyboard */
#define maxPitch 119
#define minKey 24
#define maxKey 95                                           /* <SMR 01/24/88> */

/* number of scales in zoom box */
#define numZoom 12

/* Wave window Kind */
#define waveKind 13
#define clipKind 14
#define efxKind 15

/* Minimum memory overhead required */
#define slopFactor 16384

/* heights of various pieces */
#define waveHeight 128
#define labelHeight 15
#define windowHeight (waveHeight+labelHeight+53)

/* Palette */
#define paletteH 0
#define paletteV (waveHeight+labelHeight+16)

/* Tool boxes */
#define toolsH 8
#define toolsV (waveHeight+labelHeight+22)

/* density meter */
#define densityH (toolsH+80)
#define densityV (waveHeight+labelHeight+21)

/* Report Shell */
#define reportH 298
#define reportV (waveHeight+labelHeight+16)

/* Tool boxes */
#define toolNone (-1)                                       /* <SMR 09/15/88> */
#define toolRec 0
#define toolPlay 1
#define toolDensity 2
#define toolMeter 3
#define toolSpectrum 4
#define maxTools 5

/* Report boxes */
#define repCursor 0
#define repLength 1
#define repSelBeg 2
#define repSelEnd 3
#define repLoopBeg 4
#define repLoopEnd 5
#define maxReps 6

/* defines for info */
#define hScale 0
#define vScale 1
#define recFreq 2
#define playFreq 3
#define compress 4
#define mode 5
#define windPos 6
#define rate 7
#define leftLength 8
#define rightLength 9

/* defs for user prefs record from prefs file */
#define prefDisplay 0       /* default display resolution */
#define prefLines   1       /* default dot vs lines */
#define prefExtent  2       /* default left-length vs left-right */
#define prefRate    3       /* default sampling rate */
#define prefComp    4       /* default compression */
#define prefMode    5       /* mono/stereo */
#define prefPort    6       /* True for port A (Modem) */
#define prefLoud    7       /* preferred volume */
#define prefUser    8       /* misc style (bits defined below) */
```

```
#define userPlaySel 1      /* play from selection */
#define userRecSel  2      /* record at selection */
#define userEfxSel  4      /* True if effects disabled on null selection */

/* opcodes for sound effects */ define opDoIt  0
define opEvt   1
#define opClose 3

/* Indexes into the jump table for external procs */ define iUndoModify    0
define iDeNumber      1
#define iNumber        2
#define iM2Sample      3
#define iSample2H      4
#define iUpdateWindows 5
#define iGetDialog     6
#define iGetNumItem    7
#define iSetNumItem    8
#define iWatchCursor   9
#define iStringToFixed 10
#define iFixedToString 11
#define iBlastPic      12
#define iZeroHandle    13
#define iPlotPixels    14
#define iToggleCtlItem 15
#define iUndoInsert    16
#define iUndoNone      17
#define iUndoPrep      18
#define iHitLine       19
#define iClearBits     20
#define iGetLog        21
#define iSetSelection  22
#define iGetTextItem   23
#define iSetTextItem   24
#define idB2Lin        25
#define iMBFilter      26
#define iCheckMemory   27
#define iGetCtlItem    28
#define iSetCtlItem    29
#define iEnableCtlItem 30
#define iExtractHandle 31
#define iDrawFR        32
#define iSetUserProc   33
#define iMyFix2X       34
#define iMyFrac2X      35
#define iFixATan2      36
#define iFixDiv        37
#define iFixMul        38
#define iFixRatio      39
#define iFrac2Fix      40
#define iX2Fix         41
#define iFix2Frac      42
#define iFracCos       43
#define iFracDiv       44
#define iFracMul       45
#define iFracSin       46
#define iFracSqrt      47
#define iX2Frac        48
#define iFixRound      49
#define iMungerX       50
#define iGetFixedItem  51
#define iStringToNumX  52
#define iStringToFixedX 53
#define iSafeReplace   54
#define iSafeLock      55
#define iSelSpace      56
#define iFitZoom       57
#define iDWT           58
#define iDWTinit       59
#define iDWTwindow     60
#define iPower         61
#define iFlipper       62
#define numJumps       63

/* our friend the mouse button */
define VIA 0x1D4 define maxLabText 32

/* enable bits stored in effect names */ define efxGen    1    /* effect can generate samples       */
define efxComp   2    /* effect can operate on compressed  */
#define efxStereo 4    /* effect can operate on stereo only */
```

```c
define efxColor    8           /* effect requires Color Quickdraw  */ /* <SMR 07/19/88> */ extern Ptr SoundPtr : 0x0262;
extern Ptr ApplScratch : 0xA78;     /* pointer to jump table */
/**extern Ptr CurrentA5 : 0x904;*/                                          /* <SMR 07/19/88> */
/**extern char HiliteMode : 0x938;*/                                        /* <SMR 07/19/88> */
extern char pRamVol : 0x208;

/*
    new SysEnvirons constants
*/
#define envMacIIx   5           /* Macintosh IIx    */
define env68030    4           /* 68030 processor  */ typedef struct {                /* studio session header */
    short   loopStart;
    short   loopEnd;
    char    flags[2];
    short   length;
    /* samples: ARRAY [1..1] OF SignedByte; */
} Zound, *ZoundPtr, **ZoundHandle;

typedef struct {
    short   id;
    long    any;
    Handle  h;
} Effect;

/* same structure but for 4 channel mixed one */
typedef struct {
    long    count;
    long    delta[4];
    Ptr     wave[4];
    long    ticks[4];
    long    delay[4];
    long    delta2B[4];
    Ptr     wave2B[4];
    short   null;
} Play4List;

#define pl4count    0
#define pl4delta    4
#define pl4wave     20
#define pl4ticks    36
#define pl4delay    52
#define pl4delta2B  68
#define pl4wave2B   84
#define pl4null     100
define pl4rec      102 typedef long Report[maxReps];
typedef Report *ReportPtr;
typedef ReportPtr *ReportHandle;

typedef long EditInfo[16];
typedef EditInfo *EditInfoPtr;
typedef EditInfoPtr *EditInfoHandle;

typedef struct {
    long    sampLeft, sampRight;
    short   color;
    char    text[maxLabText];
} Label, *LabelPtr, **LabelHandle;

typedef struct {
    long    sample;
    short   color;
} Color, *ColorPtr, **ColorHandle;

typedef struct {
    Point   **pts;      /* Handle of points */
    short   nKnots;     /* Number of knots */
    Rect    bounds;     /* bounds of knots */
} KnotList;

/* SoundTrack window */
typedef struct {
    DialogRecord    wind;
    char            name[64];       /* Name, possibly Untitled */
```

```
    char            resName[64];        /* file name for resources */
    short           vRefNum;
    short           untitled;           /* True if untitled */
    short           readOnly;           /* True if readOnly */
    short           dirty;              /* true if file dirty */
    short           active;             /* true if window is active */ long            fileType;           /* file type */
    short           resource;           /* true if resource not file */
    short           resKind;            /* snd 1 or 2 or ?? */

TEHandle        te;                 /* shared text edit record */ long            display;            /* division factor for display */
    short           lines;              /* True if dot vs lines */
    short           extent;             /* true if left-length vs left-right */
    short           port;               /* true if A port */ short           chanFirst;          /* first channel to display */
    short           chanLast;           /* last channel to display */

Rect            dataBox;            /* box containing graphics */
    Rect            labelBox;           /* box containing labels */
    Rect            scrollBox;          /* scroll bar's box */
    ControlHandle   scroll;             /* scroll bar itself */
    short           scrollScale;        /* multiplier fi-or scroll bar */

BitMap          offBM;              /* bitmap for above */
    short           activeRep;          /* which report is active */
    short           activeLabel;        /* active Label */
    short           activeLabel2B;      /* active Label-to-be */
    Report          reports;            /* user display values */

Handle          data[2];            /* stereo wave data itself */
    Handle          leftovers;          /* balance of snd resources */

Handle          bits;               /* offscreen bitmap */ long            selAnchor;          /* selection pivot point */
    short           caretOn;            /* True if cursor drawn */
    long            caretTime;          /* cursor time */ long            info[16];           /* info */

LabelHandle     labels;             /* handle to Labels */
    short           nLabels;            /* number of Labels */

ColorHandle     colors;             /* handle to color list */
    short           nColors;            /* # colors */
    short           baseColor;          /* color of whole wave if none */

WindowPtr       nextAlpha;          /* next window in alpha list */ short           curTool;            /* currently selected tool (or -1 if none) */ /* <SMR 09/15/88> */
} GWindow, *GWindPeek;

typedef struct {
    GWindPeek       wind;               /* which window's in mix */
    long            beg;                /* left limit in each window */
    long            end;                /* right limit in each window */
    short           chanFirst;          /* for left, right or stereo */
    short           chanLast;
    short           sRate;              /* sample rate */
    short           sMode;              /* stereo mode? */
    short           label;              /* label from window if any */
    Rect            wave;               /* boxes containing wave displays */
    Handle          bits;               /* handle to bitmaps */
    KnotList        knots;              /* list of envelopes */
} MixTrack;

typedef struct {
    GWindPeek       wind;               /* window that was undone */
    short           msg;                /* str# id for operations description */
    short           chanFirst;          /* saved chanFirst */          /* <SC 08/26/88> */
    short           chanLast;           /* saved chanLast */           /* <SC 08/26/88> */
    short           selFirst;           /* saved selection's chanFirst */  /* <SC 08/26/88> */
    short           selLast;            /* saved selection's chanLast */   /* <SC 08/26/88> */
    long            delBeg;             /* beginning of selection */
    long            delete;             /* deleted length */
    long            insBeg;             /* location of insertion */
    long            insert;             /* new insertion length */
    long            lengths[2];         /* real lengths before operation */
    long            delBegs[2];         /* real delete begins */
    long            insBegs[2];         /* real insert begins */
    short           simpleMod;          /* true if delete and insert represent a simple mod*/
    short           info;               /* saved info etc. */
    Handle          data[2];            /* saved data's */
    Handle          scrap;              /* scrap if saved */
```

```
    Handle          labels;                 /* labels if saved */
    short           nLabels;                /* number of labels */
    Handle          colors;                 /* labels if saved */
    short           nColors;                /* number of labels */
    Report          rep;                    /* saved report */
    EditInfo        inf;                    /* saved info */
    short           typing;                 /* in typing mode */
    long            mixerBegs[nMixers+1];   /* start of selection in mixer */
    long            mixerEnds[nMixers+1];   /* end   of selection in mixer */
    short           mixerLabels[nMixers+1]; /* associated label        */  /* <SMR 10/02/88> */
} UndoState;

/* Globals */ extern  EventRecord     evt;                    /* event record et al */
extern  short           evtShift, evtOption, evtCommand;
extern  Point           evtPt;
extern  long            click2Time;
extern  short           click2X;
extern  Point           clickLoc;

extern  GWindPeek       playWindow;             /* window currently playing */
extern  short           playing;

extern  Boolean         showing;                /* true if playback marker visible */
extern  long            oldPosn;

extern  short           byebye;                 /* True when time to exit */ extern  short           inBkgnd;                /* True if in background */      /* <SMR 01/24/88> */ extern  GWindPeek       front;                  /* frontmost window */
extern  GWindPeek       firstAlpha;             /* first window in alpha list */
extern  short           curDepth;               /* current screen depth */
extern  MenuHandle      menus[8];               /* our menus */ extern  Fixed           scales[numZoom];        /* density stuff */
extern  short           skips[numZoom];
extern  short           scalesX[numZoom];

extern  short           keys[12];               /* keyboard selector offsets */ extern  VBLBlock        soundVBL;               /* our VBL block */
extern  PlayList        soundTrack;             /* Info for what's playing */ extern  long            rateTable[maxPitch+1];  /* pitch # to DDA rate */       /* <SMR 01/24/88> */ extern  Effect          effects[50];            /* Effects area */
extern  char            efxBits[50];            /* style of effects */
extern  short           curEffect;              /* ID of current effect */
extern  short           undoEffect;             /* ID of last successful effect */  /* <SMR 01/23/88> */
extern  short           numEfx;                 /* number of effects */
extern  Ptr             jumpTable[numJumps];    /* jump table for run-time call back */ extern  Point           sfOrg;                  /* std file location */
extern  short           updateLock;             /* updatewindows lock */ extern  short           reportOffset;           /* horz offset of report boxes */ extern  long            prefs[16];              /* user prefs */ extern  UndoState       undone;                 /* undo state */
extern  short           unclean;                /* true from undoprep to cleanup */ extern  short           errorBase;              /* export for IOAlert */
extern  short           rangeBase;              /* export for GetNumItem, et al. */
extern  char            decimalPoint;           /* export for GetFixedItem, FixedToString */
extern  char            minusSign;              /* export for GetFixedItem, FixedToString */ extern  GWindPeek       clipboard;              /* clipboard window */
extern  DialogPtr       mixer;                  /* Mixer window */
extern  short           mixVisible;             /* mixer visible */ extern  short           macII;                  /* true if Mac II */
extern  short           fastCPU;                /* true if 020 around */
extern  short           colorCPU;               /* true if color around */
extern  short           waitOK;                 /* true if multifinder */
extern  short           stereoOK;               /* true if stereo driver OK */ extern  long            maxSpace, maxLeft;      /* used by gas meter */
extern  Ptr             maxLoc;                 /* pointer to place on screen */
extern  long            maxRow;                 /* row bytes */
extern  short           maxWords;               /* # words to blit */ extern  RGBColor        palette[16];            /* colors available */
extern  short           nMenuColors;            /* number of colors in menu */
extern  RGBColor        blackHole;              /* black RGB */
extern  Handle          oldProc,menuProc;       /* our menu proc */
```

```
extern  Fixed       logs[128];          /* log2(1)..log2(4) in 128 steps */ extern  long        memorySlop;         /* dynamic slopFactor */ extern  GrafPort    offPort;            /* 1 bit offscreen port */ extern  MixTrack    mixes[nMixers+1];   /* mix info 4 channels + dest */
extern  short       nMixed;             /* how many mix so far */
extern  Fixed       mixDelta;           /* display delta pixels/sample */
extern  short       mixSkip;            /* amount to skip */
extern  short       mixMaster;          /* master gain vs. 100 */
extern  short       mixSelect;          /* item selected */
extern  short       mixActive;          /* mixer active */ extern  short       origVolume;         /* saved volume setting */ extern  Ptr         patchArea;          /* sys heap patch jumps */
extern  Ptr         saveSetHSize;       /* real setHandleSize */
extern  Ptr         saveSysBeep;        /* real sys beep */ extern  short       portUsed[2];        /* set true when port inited */ extern  short       defResource;        /* true if resource files */ extern  short       CVSDStatus[16];     /* for cvsd conversion */ extern  short       failSafe;           /* lock out for shit */ extern  short       compRatio[];        /* compression ratios corresponding to w->info[compress]   */ extern  short       compID[];           /* corresponding compression IDs                           */ extern  long        nextUntitled;       /* next untitled window sequence number   */ /* <SC 07/20/88> */

/* Procedures from Audio.c
 */
                ActivateWindow( GWindPeek, short );
                AlphaInsert( GWindPeek );
                AlphaInval( void );
                AlphaKill( GWindPeek );
                CaretHide( GWindPeek );
                CleanCut( GWindPeek, long * );
                ClearBits( GWindPeek );
long            DeNumber( GWindPeek, char * );
                DirtyDocument( GWindPeek );
                FitZoom( GWindPeek );
short           FrontClose( void );
                HidePlayPoint( void );                                      /* <JS 04/05/88> */
void            GetNextName( char * );                                      /* <SC 07/20/88> */
long            H2Sample( GWindPeek, short );
                InvalDoc( GWindPeek );
                InvertSample( GWindPeek, long, long, short, short );
                KillDocument( GWindPeek );
                KillSound( void );
GWindPeek       NewDocument( char *, short, char * );
                Number( GWindPeek, long, char * );
long            NumberRep( GWindPeek, short, char * );
                NumBox( GWindPeek, short );
long            PinLength( GWindPeek );
long            PinSample( GWindPeek, long );
short           Sample2H( GWindPeek, long );
                Scroll2Label( GWindPeek, short );                           /* <SMR 01/28/88> */
                SelectXOR( GWindPeek );
long            SelSpace( GWindPeek );
                SetSelection( GWindPeek, long, long, short, short );
                UndoInsert( long, long );
                UndoModify( long, long );
                UndoNone( void );
short           UndoPrep( GWindPeek, short, long, long, short );
                UpdateWindows( void );

/* Procedures from AudioIO.c
 */
                FileDelete( void );
                FileOpen( void );
short           FileRead( GWindPeek );
short           FileSave( GWindPeek, short );

/* Procedures from AudioLabels.c
 */
                AskForLabel( GWindPeek );
                DrawLabel( GWindPeek, short );
                DrawLabels( GWindPeek );
                LabelClick( GWindPeek, short, Point );
                LabelClose( void );
```

```
short     LabelFind( GWindPeek, Point );
short     LabelFindLR( GWindPeek, long, long );
          LabelKill( GWindPeek, short );
          LabelOpen( GWindPeek, short, short );
          LabelRecord( GWindPeek );
          LabelRect( GWindPeek, short, Rect * );

/* Procedures from AudioMisc.c
*/
              AboutBox( void );
short         AppleTalk( void );
short         CheckMemory( long, short );
pascal void   ColorMenu( short, MenuHandle, Rect *, Point, short *);
long          Compactor(void);
              DHT( int[], int, int[], int[]);
              DHTinit( int ,int[], int[], int[] );
              DHTwindow( unsigned char[], int[], int, int[] );
              DrawClipboard( void );
short         Flipper( short, short );
short         FreqToPitch( Fixed );
DialogPtr     GetDialogX( short );
              GetEfxName( char * );
              GetKeyBox( short, Rect *, Rect *);
              GetKeyRgn( short, Rect *, RgnHandle );
Fixed         GetLog( short );
              InsertColorMenu( void );
              KillClip( void );
short         KnotClick( KnotList *, ProcPtr, short, Point );
              KnotDraw( KnotList * );
short         KnotFind( KnotList *, Point );
              KnotInit( KnotList *, Rect * );
              KnotKill( KnotList * );
              KnotOffset( KnotList *, short, short );
              KnotReset( KnotList * );
              PatchIn(void);
              PatchOut(void);
              PlotPixels( Handle, long, short, short, short, short, short, Fixed, short, Ptr, short );
              Power( int[], int, int );
              RecordPrefs(void);
Fixed         RecordTime(void);
              SetFore( RGBColor * );
          #if beta                                              /* <SMR 01/27/88> */
              Shit( char * );
          #endif                                                /* <SMR 01/27/88> */
              StereoStart( PlayList * );
              StereoVBL( void );
Ptr           Tickler( void );
              Sound4Start( Play4List * );
              SoundInstall( void );
              SoundStart( PlayList * );
              SoundRemove( void );
              SoundVBL( void );

/* Procedures from AudioSF.c
*/
              HackSFInit( void );
short         HackStdFile( short, short, char *, char *, short *, short *, ResType * );

/* Procedures from AudioSnd.c
*/
short         ConvertFromSnd( GWindPeek, Handle, short, long, long *, short * );
              ConvertToSnd( GWindPeek, long, long, short, Handle, short );
short         SniffSnd( Handle, long, short *, short *, short * );

/* Procedures from AudioInit.c
*/
              InitMain( void );

/* Procedures from AudioMix.c
*/
              KillMixer( void );
              MixActivate( short );
              MixDisconnect( short );
              MixEvent( short, EventRecord *);
              MixIdle( void );
              MixInval( GWindPeek );
              MixItUp( void );
short         MixLabel( GWindPeek, short );
void          MixLabelKill( GWindPeek, short );
void          MixLabelsKill( GWindPeek );                       /* <SMR 10/01/88> */
```

```
void        MixLabelRenew( GWindPeek, short );              /* <SMR 10/01/88> */
            MixRect( short, Rect * );
            MixRenew( short );
            MixSetup( GWindPeek, short );

/* Procedures from AudioReports.c
*/
            ReportAll( GWindPeek );
            ReportCheck( GWindPeek );
            ReportClick( GWindPeek, short );
            ReportClose( void );
            ReportCursor( GWindPeek );
            ReportDensity( GWindPeek );
            ReportJam( GWindPeek );
            ReportLength( GWindPeek );
            ReportLoop( GWindPeek );
            ReportOpen( GWindPeek, short );
            ReportRecord( GWindPeek, short );               /* <JS 08/04/88> */
            ReportRect( short, Rect * );
            ReportSelect( GWindPeek );
            ReportUpdate( GWindPeek, short, long, short );

/* Procedures from AudioSCC.c
*/
            BuildFlip( Ptr );
long        ConvertRate( Ptr, Ptr, short, short, long );
short        Flip( short );
            Interrupts( short );
long        Mono5Khz( Ptr, Ptr, long, Ptr );
long        Mono7Khz( Ptr, Ptr, long, Ptr );
long        Mono11Khz( Ptr, Ptr, long, Ptr );
long        Mono22Khz( Ptr, Ptr, long, Ptr );
short        Sample22Khz(Ptr, Rect *, Ptr, short, short );
short        SampleS22Khz(Ptr, Ptr, Rect *, Ptr, short, short );
            SCCClose( Ptr );
            SCCInit( Ptr );
            SCCPoke( Ptr, short, short );
            SCCPort( short, Ptr *, Ptr * );
long        Stereo5Khz( Ptr, Ptr, Ptr, Ptr, long, Ptr );
long        Stereo7Khz( Ptr, Ptr, Ptr, Ptr, long, Ptr );
long        Stereo11Khz( Ptr, Ptr, Ptr, Ptr, long, Ptr );
long        Stereo22Khz( Ptr, Ptr, Ptr, Ptr, long, Ptr );
```

Mixer.h

```
/* Mixer stuff */
#define nMixers 4
#define mixRowBytes 26
#define mixWidth 198
#define mixHeight 40
#define mixRealHite (mixHeight + 2*knotIndent)
#define mixSpacing 55
#define mixH 131
#define mixV 11
#define mixOut nMixers
#define knotIndent 2
```

We claim:

1. A device for editing sounds comprising:
   means for storing a sound waveform;
   means for visually displaying the stored waveform;
   means for editing the appearance of a predetermined portion of the visually displayed waveform by manipulation of said visually displayed waveform; and
   means for changing the sound waveform stored in the means for storing in accordance with changes made in the visually displayed waveform by the means for editing;
   wherein the means for storing stores a digital representation of the waveform, and the means for displaying displays an analog representation of the waveform; and
   wherein the means for displaying comprises a display displaying the amplitude of the waveform along a first associated axis and time along a second associated axis;
   and wherein the means for editing comprises:
   means for displaying a sound characteristics control line adjacent to the displayed waveform; and
   means for displacing at least one segment of the sound characteristics control line adjacent to the portion of the displayed waveform;
   wherein the means for editing comprises means for altering a specified characteristic of a portion of the stored waveform corresponding to the portion of the displayed waveform adjacent to the displaced line segment.

2. The device of claim 1, wherein each of the means comprise a portion of a computer.

3. The device of claim 2, wherein the computer comprises a Macintosh computer and a computer program installed in the Macintosh computer.

4. The device of claim 1, wherein the display means comprises means for simultaneously displaying a plurality of independent waveforms.

5. The device of claim 4, wherein the means for editing comprises means for mixing the independent waveforms.

6. The device of claim 5, wherein the means for mixing comprises:
   means for moving each independent displayed waveform relative to the associated time axis; and
   means for combining the independently displayed waveforms wherein a stored waveform the visual representation of which has been moved relative to the associated time axis is correspondingly shifted in time relative to the other independent waveforms by the means for editing.

7. The device of claim 5, wherein the means for displaying displays four independent waveforms.

8. The device of claim 1, wherein the sounds are multichannel sounds.

9. The device of claim 8, wherein the means for displaying simultaneously displays a separate waveform for each channel of a multichannel sound.

10. The device of claim 8, wherein the means for editing independently edits each channel of a multichannel sound.

11. The device of claim 1, wherein the means for displacing comprises means for indicating a specific point on the sound characteristics control line, which specific point denotes one end of the line segment.

12. The device of claim 1, wherein the means for editing comprises:
   means for selecting a portion of the waveform; and
   means for moving the selected portion to a position on the waveform other than an original position of the selected portion.

13. The device of claim 1, wherein the means for editing comprises:
   means for selecting a portion of the waveform; and
   means for copying the selected portion and inserting the copied portion in the waveform.

14. The device of claim 1, wherein the means for editing comprises:
   means for selecting a portion of the waveform; and
   means for deleting the selected portion from the waveform.

15. The device of claim 1, wherein the amount of alteration of the specified characteristic is a function of the amount of displacement of the line segment.

16. A method for editing sounds comprising the steps of:
   storing a sound waveform;
   visually displaying the waveform;
   editing the appearance of the visually displayed waveform by manipulation of said visually displayed waveform; and
   changing the stored sound waveform in accordance with changes made in the visually displayed waveform by the step of editing; and
   wherein the step of storing comprises storing a digital representation of the waveform, and the step of displaying comprises displaying an analog representation of the waveform; and
   wherein the step of displaying comprises displaying the amplitude of the waveform along a first associated axis and time along a second associated axis;
   wherein the step of editing comprises:
   displaying an amplitude control line substantially parallel to the time axis; and
   displacing at least one segment of the line adjacent to a portion of the displayed amplitude peaks;
   wherein the step of editing comprises altering the amplitude of a portion of the amplitude peaks of the stored waveform corresponding to the portion of the displayed amplitude peaks adjacent to the displaced line segment, the amount of alteration of the amplitude being a function of the amount of displacement of the line segment.

17. A method for editing sounds comprising the steps of:
   storing a sound waveform;
   visually displaying the waveform;
   editing the appearance of the visually displayed waveform by manipulation of said visually displayed waveform; and
   changing the stored sound waveform in accordance with changes made in the visually displayed waveform by the step of editing; and
   wherein the step of storing comprises storing a digital representation of the waveform, and the step of displaying comprises displaying an analog representation of the waveform; and
   wherein the step of displaying comprises displaying the amplitude of the waveform along a first associated axis and time along a second associated axis;
   wherein the step of editing comprises:
   displaying a pitch control line substantially parallel to the time axis; and
   displacing at least one segment of the line adjacent to a portion of the display amplitude peaks;
   wherein the step of editing comprises altering the pitch of a portion of the stored waveform corresponding to the portion of the displayed amplitude peaks adjacent to the displaced line segment, the amount of alteration of the pitch being a function of the amount of displacement of the line segment.

18. A device for editing sounds comprising:
   means for storing a sound waveform;
   means for visually displaying the stored waveform;
   means for editing the appearance of a predetermined portion of the visually displayed waveform by manipulation of said visually displayed waveform; and
   means for changing the sound waveform stored in the means for storing in accordance with changes made in the visually displayed waveform by the means for editing;
   wherein the means for storing stores a digital representation of the waveform, and the means for displaying displays an analog representation of the waveform; and
   wherein the means for displaying comprises a display displaying the amplitude of the waveform along a first associated axis and time along a second associated axis; and
   wherein the means for editing comprises:
   means for displaying an amplitude control line substantially parallel to the time axis; and
   means for displacing at least one segment of the line adjacent to a portion of the displayed amplitude peaks;
   wherein the means for editing comprises means for altering the amplitude of a portion of the amplitude peaks of the stored waveform corresponding to the portion of the displayed amplitude peaks adjacent to the displaced line segment, the amount of alteration of the amplitude being a function of the amount of displacement of the line segment.

19. A device for editing sounds comprising:
   means for storing a sound waveform;
   means for visually displaying the stored waveform;

means for editing the appearance of a predetermined portion of the visually displayed waveform by manipulation of said visually displayed waveform; and means for changing the sound waveform stored in the means for storing in accordance with changes made in the visually displayed waveform by the means for editing;

wherein the means for storing stores a digital representation of the waveform, and the means for displaying displays an analog representation of the waveform; and wherein the means for displaying comprises a display displaying the amplitude of the waveform along a first associated axis and time along a second associated axis; and wherein the means for editing comprises:

means for displaying a pitch control line substantially parallel to the time axis;

means for displacing at least one segment of the line adjacent to a portion of the display amplitude peaks; and wherein the means for editing comprises means for altering the pitch of a portion of the stored waveform corresponding to the portion of the displayed amplitude peaks adjacent to the displaced line segment, the amount of alteration of the pitch being a function of the amount of displacement of the line segment.

20. A method for editing sounds comprising the steps of:

storing a sound waveform;
visually displaying the waveform;
editing the appearance of the visually displayed waveform by manipulation of said visually displayed waveform; and
changing the stored sound waveform in accordance with changes made in the visually displayed waveform by the step of editing; and
wherein the step of storing comprises storing a digital representation of the waveform, and the step of displaying comprises displaying an analog representation of the waveform; and
wherein the step of displaying comprises displaying the amplitude of the waveform along a first associated axis and time along a second associated axis;
wherein the step of editing comprises:
displaying a sound characteristics control line adjacent to the displayed waveform; and
displacing at least one segment of the sound characteristics control line adjacent to a portion of the displayed waveform;
wherein the step of editing comprises altering a specified characteristic of a portion of the stored waveform corresponding to the portion of the displayed waveform adjacent to the displaced line segment.

21. The method of claim 20, wherein the step of displaying comprises displaying the amplitude of the waveform along a first associated axis and time along a second associated axis.

22. The method of claim 20, wherein the step of displaying comprises simultaneously displaying a plurality of independent waveforms.

23. The method of claim 22, wherein the step of editing comprises mixing the independent waveforms.

24. The method of claim 23, wherein the step of mixing comprises:

moving each independent displayed waveform relative to the associated time axis;
combining the independently displayed waveforms wherein a stored waveform the visual representation of which has been moved relative to the associated time axis is correspondingly shifted in time relative to the other independent waveforms by the step of editing.

25. The method of claim 23, wherein the step of displaying comprises displaying four independent waveforms.

26. The method of claim 20, wherein the amount of alteration of the specified characteristic is a function of the amount of displacement of the line segment.

27. The method of claim 20, wherein the step of displacing comprises indicating a specific point on the sound characteristics control line, with specific point denotes one end of the line segment.

28. The method of claim 20, wherein the sounds are multichannel sounds.

29. The method of claim 28, wherein the step of displaying simultaneously displays a separate waveform for each channel of a multichannel round.

30. The method of claim 28, wherein the step of editing independently changes each channel of a multichannel sound.

31. A method for editing sounds comprising the steps of:

storing a sound waveform;
visually displaying the waveform;
editing the appearance of the visually displayed waveform by manipulation of said visually displayed waveform; and
changing the stored sound waveform in accordance with changes made in the visually displayed waveform by the step of editing;
wherein the step of editing comprises:
selecting a portion of the waveform; and
moving the selected portion to a position in the waveform other than an original position of the selected portion.

32. A method for editing sounds comprising the steps of:

storing a sound waveform;
visually displaying the waveform;
editing the appearance of the visually displayed waveform by manipulation of said visually displayed waveform; and
changing the stored sound waveform in accordance with changes made in the visually displayed waveform by the step of editing;
wherein the step of editing comprises:
selecting a portion of the waveform; and
copying the selected portion and inserting the copied portion in the waveform.

33. A method for editing sounds comprising the steps of:

storing a sound waveform;
visually displaying the waveform;
editing the appearance of the visually displayed waveform by manipulation of said visually displayed waveform; and
changing the stored sound waveform in accordance with changes made in the visually displayed waveform by the step of editing;
wherein the step of editing comprises:

selecting a portion of the waveform; and
deleting the selected portion from the waveform.

34. A device for editing sounds comprising:
means for storing a sound waveform;
means for visually displaying the stored waveform;
means for editing the appearance of a predetermined portion of the visually displayed waveform by manipulation of said visually displayed waveform; and
means for changing the sound waveform stored in the means for storing in accordance with changes made in the visually displayed waveform by the means for editing;
wherein the means for editing comprises:
means for displaying a sound characteristics control line adjacent to the displayed waveform; and
means for displacing at least one segment of the sound characteristics control line adjacent to a portion of the displayed waveform;
wherein the means for editing comprises means for altering a specified characteristic of a portion of the stored waveform corresponding to the portion of the displayed waveform adjacent to the displaced line segment.

35. A method for editing sounds comprising the steps of:
storing a sound waveform;
visually displaying the waveform;
editing the appearance of the visually displayed waveform by manipulation of said visually displayed waveform; and
changing the stored sound waveform in accordance with changes made in the visually displayed waveform by the step of editing;
wherein the step of editing comprises:
displaying a sound characteristics control line adjacent to the displayed waveform; and
displacing at least one segment of the sound characteristics control line adjacent to a portion of the displayed waveform;
wherein the step of altering comprises altering a specified characteristic of a portion of the stored waveform corresponding to the portion of the displayed waveform adjacent to the displaced line segment.

* * * * *

UNITED STATES PATENT AND TRADEMARK OFFICE
CERTIFICATE OF CORRECTION

PATENT NO. : 5,151,998
DATED : September 29, 1992
INVENTOR(S) : Stephen P. Capps, Samuel M. Roberts, Michael P. Lamoureux and Josef Sensendorf It is certified that error appears in the above-identified patent and that said Letters Patent is hereby corrected as shown below:

On the Title page, item [75], inventor:

Add --Samuel M. Roberts, Michael P. Lamoureux and Josef Sensendorf-- as inventors.

Col. 3, line 17, delete "stero" and add --stereo--.

Col. 3, line 30, delete ")".

Col. 3, line 53, delete ")".

Col. 5, line 59, delete "incrase" and insert --increase--.

Signed and Sealed this

Thirtieth Day of November, 1993

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO.   : 5,151,998
DATED        : September 29, 1992
INVENTOR(S)  : Stephen P. Capps, et. al.

It is certified that error appears in the above-identified patent and that said Letters Patent is hereby corrected as shown below:

Title page, item [75], inventors: should read-- Samuel M. Roberts, Michael P. Lamoureux and Josef Sensendorf--

Signed and Sealed this

Twenty-fourth Day of September, 1996

*Attest:*

BRUCE LEHMAN

*Attesting Officer*  *Commissioner of Patents and Trademarks*